United States Patent
Fuse

(10) Patent No.: US 9,143,654 B2
(45) Date of Patent: Sep. 22, 2015

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Koji Fuse, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/276,789

(22) Filed: May 13, 2014

(65) Prior Publication Data
US 2014/0340715 A1 Nov. 20, 2014

(30) Foreign Application Priority Data

May 15, 2013 (JP) ................................. 2013-103323
Apr. 11, 2014 (JP) ................................. 2014-082023

(51) Int. Cl.
*H04N 1/40* (2006.01)
*H04N 1/409* (2006.01)

(52) U.S. Cl.
CPC .................................. *H04N 1/4092* (2013.01)

(58) Field of Classification Search
CPC ..... G06T 11/203; G06T 11/20; G06T 11/206; G06T 2207/10024; G06T 2207/30144; G06T 2207/30176; G06T 7/0081; G06T 7/0083; G06T 7/0085; G06T 7/408; G06T 9/20; H04N 1/58; H04N 11/06; H04N 21/4312; H04N 5/44504
USPC ......... 358/2.1, 2.99, 468, 448, 452, 462, 464; 382/195, 202, 254, 256–261, 274–275; 715/763–764, 769–770
See application file for complete search history.

(56) References Cited

U.S. PATENT DOCUMENTS

| | | | | |
|---|---|---|---|---|
| 3,978,340 A | * | 8/1976 | Schroeder | 250/462.1 |
| 4,263,555 A | * | 4/1981 | Hunka | 327/323 |
| 6,476,829 B1 | * | 11/2002 | Smith et al. | 715/764 |
| 6,877,138 B2 | * | 4/2005 | Fitzpatrick et al. | 715/769 |
| 2012/0050761 A1 | * | 3/2012 | Tsunekawa | 358/1.9 |

FOREIGN PATENT DOCUMENTS

JP 2007-300206 A 11/2007

* cited by examiner

*Primary Examiner* — Thomas D Lee
*Assistant Examiner* — Stephen M Brinich
(74) *Attorney, Agent, or Firm* — Canon USA Inc. IP Division

(57) ABSTRACT

An image processing apparatus includes an input unit that accepts input data, a detecting unit that detects line information from the input data, the line information indicating color information about a line included in the input data, color information about the background of the line, the width of the line, and a converting unit that converts the line information based on a contrast integrated value and the difference between the color information about the background and the color information about the line, the contrast integrated value being determined by the color information about the background, the color information about the line, and the width of the line.

13 Claims, 26 Drawing Sheets

FIG. 2

FIG. 3

| PRE-CONVERSION LINE INFORMATION | | | | | | | POST-CONVERSION LINE INFORMATION | | | |
|---|---|---|---|---|---|---|---|---|---|---|
| COLOR INFORMATION ABOUT BACKGROUND OF LINE | | | COLOR INFORMATION ABOUT LINE | | | WIDTH OF LINE | COLOR INFORMATION ABOUT LINE | | | WIDTH OF LINE |
| R | G | B | R | G | B | | R | G | B | |
| ⋮ | ⋮ | ⋮ | ⋮ | ⋮ | ⋮ | ⋮ | ⋮ | ⋮ | ⋮ | ⋮ |
| 128 | 128 | 128 | 0 | 0 | 0 | 0.12 pt | 64 | 64 | 64 | 0.24 pt |
| ⋮ | ⋮ | ⋮ | ⋮ | ⋮ | ⋮ | ⋮ | ⋮ | ⋮ | ⋮ | ⋮ |
| 128 | 128 | 128 | 192 | 192 | 192 | 0.24 pt | 255 | 255 | 255 | 0.12 pt |
| ⋮ | ⋮ | ⋮ | ⋮ | ⋮ | ⋮ | ⋮ | ⋮ | ⋮ | ⋮ | ⋮ |
| 192 | 192 | 192 | 128 | 128 | 128 | 0.24 pt | 64 | 64 | 64 | 0.12 pt |
| ⋮ | ⋮ | ⋮ | ⋮ | ⋮ | ⋮ | ⋮ | ⋮ | ⋮ | ⋮ | ⋮ |

FIG. 11

1201:
```
<?xml version="1.0" standalone="no"?>
<!DOCTYPE svg PUBLIC "-//W3C//DTD SVG 1.1//EN" "http://www.w3.org/Graphics/SVG/1.1/DTD/svg11.dtd">
<svg width="72pt" height="72pt" xmlns="http://www.w3.org/2000/svg">
<rect x="0pt" y="0pt" width="72pt" height="72pt" fill="rgb(192, 192, 192)"/>
<line x1="0pt" y1="36pt" x2="72pt" y2="36pt" stroke-width="0.12pt" stroke="rgb(144, 144, 144)" />
</svg>
```

- COLOR INFORMATION ABOUT BACKGROUND OF LINE → `rgb(192, 192, 192)`
- COLOR INFORMATION ABOUT LINE → `rgb(144, 144, 144)`

1202:
```
<?xml version="1.0" standalone="no"?>
<!DOCTYPE svg PUBLIC "-//W3C//DTD SVG 1.1//EN" "http://www.w3.org/Graphics/SVG/1.1/DTD/svg11.dtd">
<svg width="72pt" height="72pt" xmlns="http://www.w3.org/2000/svg">
<rect x="0pt" y="0pt" width="72pt" height="72pt" fill="rgb(192, 192, 192)"/>
<line x1="0pt" y1="36pt" x2="72pt" y2="36pt" stroke-width="0.12pt" stroke-dasharray="0.12pt 0.36pt" stroke="rgb(0, 0, 0)"
fill="rgb(192, 192, 192)"/>
</svg>
```

- COLOR INFORMATION ABOUT BACKGROUND OF LINE → `rgb(192, 192, 192)`
- STROKE ATTRIBUTE / LENGTH OF STROKE / INTERVAL BETWEEN STROKES → `stroke-dasharray="0.12pt 0.36pt"`
- COLOR INFORMATION ABOUT LINE → `rgb(0, 0, 0)`

FIG. 12

| PRE-CONVERSION LINE INFORMATION ||||||| POST-CONVERSION LINE INFORMATION ||||||
|---|---|---|---|---|---|---|---|---|---|---|---|---|
| COLOR INFORMATION ABOUT BACKGROUND OF LINE ||| COLOR INFORMATION ABOUT LINE ||| STROKE INFORMATION ABOUT LINE || COLOR INFORMATION ABOUT LINE ||| STROKE INFORMATION ABOUT LINE ||
| R | G | B | R | G | B | LENGTH OF STROKE | INTERVAL BETWEEN STROKES | R | G | B | LENGTH OF STROKE | INTERVAL BETWEEN STROKES |
| 192 | 192 | 192 | 144 | 144 | 144 | N/A | N/A | 0 | 0 | 0 | 0.12 pt | 0.36 pt |
| ... | ... | ... | ... | ... | ... | ... | ... | ... | ... | ... | ... | ... |
| 128 | 128 | 128 | 0 | 255 | 255 | 0.12 pt | 0.12 pt | 64 | 192 | 192 | N/A | N/A |
| ... | ... | ... | ... | ... | ... | ... | ... | ... | ... | ... | ... | ... |
| 150 | 150 | 150 | 100 | 100 | 100 | 0.36 pt | 0.36 pt | 0 | 0 | 0 | 0.06 pt | 0.30 pt |
| ... | ... | ... | ... | ... | ... | ... | ... | ... | ... | ... | ... | ... |

| | | \multicolumn{8}{c}{WIDTH OF LINE PRIOR TO CONVERSION $W_{IN}$(pt)} |
|---|---|---|---|---|---|---|---|---|---|
| | | 0.06 | 0.12 | 0.18 | 0.24 | 0.30 | 0.36 | 0.42 | ... |
| WIDTH OF LINE AFTER UPDATE $W_n$(pt) | 0.06 | 0.00 | 0.00 | 0.02 | 0.07 | 0.16 | 0.32 | 0.55 | ... |
| | 0.12 | 0.00 | 0.00 | 0.01 | 0.04 | 0.12 | 0.26 | 0.47 | ... |
| | 0.18 | 0.02 | 0.01 | 0.00 | 0.01 | 0.07 | 0.18 | 0.36 | ... |
| | 0.24 | 0.07 | 0.04 | 0.01 | 0.00 | 0.02 | 0.09 | 0.23 | ... |
| | 0.30 | 0.16 | 0.12 | 0.11 | 0.02 | 0.00 | 0.03 | 0.12 | ... |
| | 0.36 | 0.32 | 0.26 | 0.18 | 0.09 | 0.03 | 0.00 | 0.03 | ... |
| | 0.42 | 0.55 | 0.47 | 0.36 | 0.23 | 0.12 | 0.03 | 0.00 | ... |
| | ⋮ | ⋮ | ⋮ | ⋮ | ⋮ | ⋮ | ⋮ | ⋮ | ⋱ |

| PRE-CONVERSION LINE INFORMATION | | | | | | | | | POST-CONVERSION LINE INFORMATION | | | | | | | | |
|---|---|---|---|---|---|---|---|---|---|---|---|---|---|---|---|---|---|
| COLOR INFORMATION ABOUT BACKGROUND OF LINE | | | COLOR INFORMATION ABOUT LINE | | | STROKE INFORMATION ABOUT LINE | | | COLOR INFORMATION ABOUT BACKGROUND OF LINE | | | COLOR INFORMATION ABOUT LINE | | | STROKE INFORMATION ABOUT LINE | |
| R | G | B | R | G | B | LENGTH OF STROKE | INTERVAL BETWEEN STROKES | | R | G | B | R | G | B | LENGTH OF STROKE | INTERVAL BETWEEN STROKES |
| 192 | 192 | 192 | 153 | 153 | 153 | N/A | N/A | | 0 | 0 | 0 | 255 | 255 | 255 | 0.36 pt | 0.24 pt |
| 51 | 51 | 204 | 153 | 153 | 153 | 0.12 pt | 0.12 pt | | 51 | 51 | 204 | 102 | 102 | 153 | N/A | N/A |
| ... | ... | ... | ... | ... | ... | ... | ... | | ... | ... | ... | ... | ... | ... | ... | ... |
| 51 | 51 | 51 | 102 | 102 | 102 | 0.24 pt | 0.12 pt | | 0 | 0 | 0 | 255 | 255 | 255 | 0.12 pt | 0.24 pt |
| ... | ... | ... | ... | ... | ... | ... | ... | | ... | ... | ... | ... | ... | ... | ... | ... |

```
<?xml version="1.0" standalone="no"?>
<!DOCTYPE svg PUBLIC "-//W3C//DTD SVG 1.1//EN" "http://www.w3.org/Graphics/SVG/1.1/DTD/svg11.dtd">
<svg width="72pt" height="72pt" xmlns="http://www.w3.org/2000/svg">

<line x1="0pt" y1="36pt" x2="72pt" y2="36pt" stroke-width="0.12pt" stroke="rgb(51, 51, 51)" />
<line x1="0pt" y1="36pt" x2="72pt" y2="36pt" stroke-width="0.12pt" stroke-dasharray="0.24pt 0.12pt" stroke="rgb(102, 102, 102)"/>
</svg>
```

- rgb(51, 51, 51) — COLOR INFORMATION ABOUT BACKGROUND OF LINE
- rgb(102, 102, 102) — COLOR INFORMATION ABOUT LINE
- 0.24pt — LENGTH OF STROKE
- 0.12pt — INTERVAL BETWEEN STROKES

2102

```
<?xml version="1.0" standalone="no"?>
<!DOCTYPE svg PUBLIC "-//W3C//DTD SVG 1.1//EN" "http://www.w3.org/Graphics/SVG/1.1/DTD/svg11.dtd">
<svg width="72pt" height="72pt" xmlns="http://www.w3.org/2000/svg">

<line x1="0pt" y1="36pt" x2="72pt" y2="36pt" stroke-width="0.12pt" stroke="rgb(0, 0, 0)" />
<line x1="0pt" y1="36pt" x2="72pt" y2="36pt" stroke-width="0.12pt" stroke-dasharray="0.12pt 0.24pt" stroke="rgb(255, 255, 255)"/>
</svg>
```

- rgb(0, 0, 0) — COLOR INFORMATION ABOUT BACKGROUND OF LINE
- rgb(255, 255, 255) — COLOR INFORMATION ABOUT LINE
- 0.12pt — LENGTH OF STROKE
- 0.24pt — INTERVAL BETWEEN STROKES

FIG. 22

```
<?xml version="1.0" standalone="no"?>
<!DOCTYPE svg PUBLIC "-//W3C//DTD SVG 1.1//EN" "http://www.w3.org/Graphics/SVG/1.1/DTD/svg11.dtd">
<svg width="72pt" height="72pt" xmlns="http://www.w3.org/2000/svg">   COLOR INFORMATION ABOUT BACKGROUND OF LINE    COLOR INFORMATION ABOUT LINE
<line x1="0pt" y1="36pt" x2="72pt" y2="36pt" stroke-width="0.12pt" stroke="rgb(79, 43, 105)" />
<line x1="0pt" y1="36pt" x2="72pt" y2="36pt" stroke-width="0.12pt" stroke-dasharray="0.24pt 0.12pt"
stroke="rgb(107, 146, 23)"/>         LENGTH OF STROKE    INTERVAL BETWEEN STROKES
</svg>
```
— 2501

```
<?xml version="1.0" standalone="no"?>
<!DOCTYPE svg PUBLIC "-//W3C//DTD SVG 1.1//EN" "http://www.w3.org/Graphics/SVG/1.1/DTD/svg11.dtd">
<svg width="72pt" height="72pt" xmlns="http://www.w3.org/2000/svg">   COLOR INFORMATION ABOUT BACKGROUND OF LINE    COLOR INFORMATION ABOUT LINE
<line x1="0pt" y1="36pt" x2="72pt" y2="36pt" stroke-width="0.12pt" stroke="gray(207)" />
<line x1="0pt" y1="36pt" x2="72pt" y2="36pt" stroke-width="0.12pt" stroke-dasharray="0.24pt 0.12pt"
stroke="gray(133)"/>                                                                                                   C (CYAN)

<line x1="0pt" y1="36pt" x2="72pt" y2="36pt" stroke-width="0.12pt" stroke="gray(224)" />
<line x1="0pt" y1="36pt" x2="72pt" y2="36pt" stroke-width="0.12pt" stroke-dasharray="0.24pt 0.12pt"
stroke="gray(56)"/>                                                                                                    M (MAGENTA)

<line x1="0pt" y1="36pt" x2="72pt" y2="36pt" stroke-width="0.12pt" stroke="gray(54)" />
<line x1="0pt" y1="36pt" x2="72pt" y2="36pt" stroke-width="0.12pt" stroke-dasharray="0.24pt 0.12pt"
stroke="gray(252)"/>                                                                                                   Y (YELLOW)

<line x1="0pt" y1="36pt" x2="72pt" y2="36pt" stroke-width="0.12pt" stroke="gray(36)" />
<line x1="0pt" y1="36pt" x2="72pt" y2="36pt" stroke-width="0.12pt" stroke-dasharray="0.24pt 0.12pt"
stroke="gray(41)"/>                                                                                                    K (BLACK)
</svg>
```
— 2502

```
<?xml version="1.0" standalone="no"?>
<!DOCTYPE svg PUBLIC "-//W3C//DTD SVG 1.1//EN" "http://www.w3.org/Graphics/SVG/1.1/DTD/svg11.dtd">
<svg width="72pt" height="72pt" xmlns="http://www.w3.org/2000/svg">   COLOR INFORMATION ABOUT BACKGROUND OF LINE    COLOR INFORMATION ABOUT LINE
<line x1="0pt" y1="36pt" x2="72pt" y2="36pt" stroke-width="0.12pt" stroke="gray(0)" />
<line x1="0pt" y1="36pt" x2="72pt" y2="36pt" stroke-width="0.12pt" stroke-dasharray="0.26pt 0.10pt"
stroke="gray(255)"/>                                                                                                   C (CYAN)

<line x1="0pt" y1="36pt" x2="72pt" y2="36pt" stroke-width="0.12pt" stroke="gray(0)" />
<line x1="0pt" y1="36pt" x2="72pt" y2="36pt" stroke-width="0.12pt" stroke-dasharray="0.24pt 0.12pt"
stroke="gray(255)"/>                                                                                                   M (MAGENTA)

<line x1="0pt" y1="36pt" x2="72pt" y2="36pt" stroke-width="0.12pt" stroke="gray(0)" />
<line x1="0pt" y1="36pt" x2="72pt" y2="36pt" stroke-width="0.12pt" stroke-dasharray="0.17pt 0.19pt"
stroke="gray(255)"/>                                                                                                   Y (YELLOW)

<line x1="0pt" y1="36pt" x2="72pt" y2="36pt" stroke-width="0.12pt" stroke="gray(0)" />
<line x1="0pt" y1="36pt" x2="72pt" y2="36pt" stroke-width="0.12pt" stroke-dasharray="0.05pt 0.31pt"
stroke="gray(255)"/>                                                                                                   K (BLACK)
</svg>
```
— 2503

FIG. 23

| PRE-CONVERSION LINE INFORMATION | | | | | | | | | | | POST-CONVERSION LINE INFORMATION | | | | | | | | | | | |
|---|---|---|---|---|---|---|---|---|---|---|---|---|---|---|---|---|---|---|---|---|---|---|
| COLOR INFORMATION ABOUT BACKGROUND OF LINE | | | | COLOR INFORMATION ABOUT LINE | | | | STROKE INFORMATION ABOUT LINE | | | COLOR INFORMATION ABOUT BACKGROUND OF LINE | | | | COLOR INFORMATION ABOUT LINE | | | | STROKE INFORMATION ABOUT LINE | | | |
| C | M | Y | K | C | M | Y | K | LENGTH OF STROKE | INTERVAL BETWEEN STROKES | | C | M | Y | K | C | M | Y | K | C | M | Y | K |
| | | | | | | | | | | | | | | | | | | | LENGTH OF STROKE / INTERVAL BETWEEN STROKES | LENGTH OF STROKE / INTERVAL BETWEEN STROKES | LENGTH OF STROKE / INTERVAL BETWEEN STROKES | LENGTH OF STROKE / INTERVAL BETWEEN STROKES |
| 0 | 0 | 0 | 0 | 232 | 50 | 32 | 10 | N/A | N/A | ... | 0 | 0 | 0 | 0 | 255 | 255 | 255 | 255 | 0.33 pt / 0.03 pt | 0.07 pt / 0.29 pt | 0.05 pt / 0.31 pt | 0.01 pt / 0.35 pt |
| 0 | 0 | 0 | 0 | 224 | 232 | 128 | 32 | 0.12 pt | 0.12 pt | ... | 0 | 0 | 0 | 0 | 112 | 116 | 64 | 16 | N/A | N/A | N/A | N/A |
| 207 | 224 | 54 | 36 | 136 | 56 | 252 | 41 | 0.24 pt | 0.12 pt | ... | 0 | 0 | 0 | 0 | 255 | 255 | 255 | 255 | 0.26 pt / 0.10 pt | 0.24 pt / 0.12 pt | 0.17 pt / 0.19 pt | 0.05 pt / 0.31 pt |

```
<?xml version="1.0" standalone="no"?>
<!DOCTYPE svg PUBLIC "-//W3C//DTD SVG 1.1//EN" "http://www.w3.org/Graphics/SVG/1.1/DTD/svg11.dtd">
<svg width="72pt" height="72pt" xmlns="http://www.w3.org/2000/svg">
<rect x="0px" y="0px" width="9pt" height="12pt" fill="gray(25%)"/>                          ~3002
<line x1="4.5px" y1="0px" x2="4.5px" y2="12px" stroke-width="1px" stroke="gray(75%)" />     ~3003
</svg>
```

3004

```
<?xml version="1.0" standalone="no"?>
<!DOCTYPE svg PUBLIC "-//W3C//DTD SVG 1.1//EN" "http://www.w3.org/Graphics/SVG/1.1/DTD/svg11.dtd">
<svg width="72pt" height="72pt" xmlns="http://www.w3.org/2000/svg">
<rect x="0px" y="0px" width="9pt" height="12pt" fill="gray(25%)"/>                          ~3005
<line x1="4.5px" y1="0px" x2="4.5px" y2="12px" stroke-width="1px" stroke="gray(0%)" />      ~3006
<line x1="4.5px" y1="0px" x2="4.5px" y2="12px" stroke-width="1px" stroke-dasharray="3px 1px"
 stroke="gray(100%)"/>                                                                      ~3007
</svg>
```

IMAGE PROCESSING APPARATUS, IMAGE PROCESSING METHOD, AND STORAGE MEDIUM

BACKGROUND OF THE INVENTION

1. Field of the Invention

The present application generally relates to image processing and, more particularly, to an image processing apparatus, method, and storage medium, and a technology for performing a halftoning process on a line-containing image with high reproducibility.

2. Description of the Related Art

There are electrophotographic printers and inkjet printers that have been known as image output apparatuses that form images on recording media. In those image output apparatuses, the number of tone levels that can be output is often smaller than the number of tone levels in input digital image data. Therefore, a representation method involving area coverage modulation is used as a method of expressing shadings in an output image. Area coverage modulation is a method of expressing shadings by varying the proportion of the colorant applied area on a recording medium. Methods involving area coverage modulation are roughly classified into AM (amplitude modulation) screening and FM (frequency modulation) screening.

In AM screening, halftone dots are formed by spatially gathering and arranging minute dots, and shadings are expressed by varying the sizes of the halftone dots. In FM screening, on the other hand, minute dots are spatially scattered at random, and shadings are expressed by varying the density of the minute dots. In an image subjected to such screening, discontinuities might appear in fine lines. Fine line discontinuities are phenomena that occur when halftone dots for screening interfere with fine lines. In view of this, Japanese Patent Application Laid-Open No. 2007-300206 discloses a method of performing correction on a pre-screen-processing image to be input to a screen processing unit, using a gamma correction LUT specially designed for linear regions. By this method, the tonal values in the linear regions included in an image are corrected to be darker, so that fine line discontinuities due to screen processing can be corrected.

By the method disclosed in Japanese Patent Application Laid-Open No. 2007-300206, the tonal values in the linear regions in a pre-screen-processing image are corrected. As a result, the width of each line in an image that is output from an image output apparatus might appear greater than a desired width.

SUMMARY OF THE INVENTION

In view of the above circumstances, the present disclosure generally aims to appropriately correct lines included in an image, and output a high-quality image.

To solve the above problem, an aspect of the present disclosure provides an image processing apparatus that includes: an input unit that accepts input data; a detecting unit that detects line information from the input data, the line information indicating color information about a line included in the input data, color information about the background of the line, the width of the line; and a converting unit that converts the line information based on a contrast integrated value and the difference between the color information about the background and the color information about the line, the contrast integrated value being determined by the color information about the background, the color information about the line, and the width of the line.

Further features of the present disclosure will become apparent from the following description of exemplary embodiments (with reference to the attached drawings).

BRIEF DESCRIPTION OF THE DRAWINGS

FIG. 2 shows an example of line information expressed by SVG (scalable vector graphics).

FIG. 3 is an example of a line information conversion table.

FIG. 11 shows an example of line information expressed by SVG.

FIG. 12 shows an example of a line information conversion table.

FIG. 16 is a line width variation evaluation value table in which values of a line width evaluation function E are written.

FIG. 17 shows an example of a line information conversion table.

FIG. 18 shows an example of line information expressed by SVG.

FIG. 22 shows an example of line information expressed by SVG.

FIG. 23 shows an example of a line information conversion table.

FIG. 27 shows an example of line information expressed by SVG.

DESCRIPTION OF THE EMBODIMENTS

First Embodiment

The following is a description of the present disclosure based on preferred embodiments, with reference to the accompanying drawings. It should be noted that the embodiments described below do not limit the present disclosure claimed herein, and not all combinations of features described in the embodiments are essential as the means to achieve the present disclosure.

Figure 1:
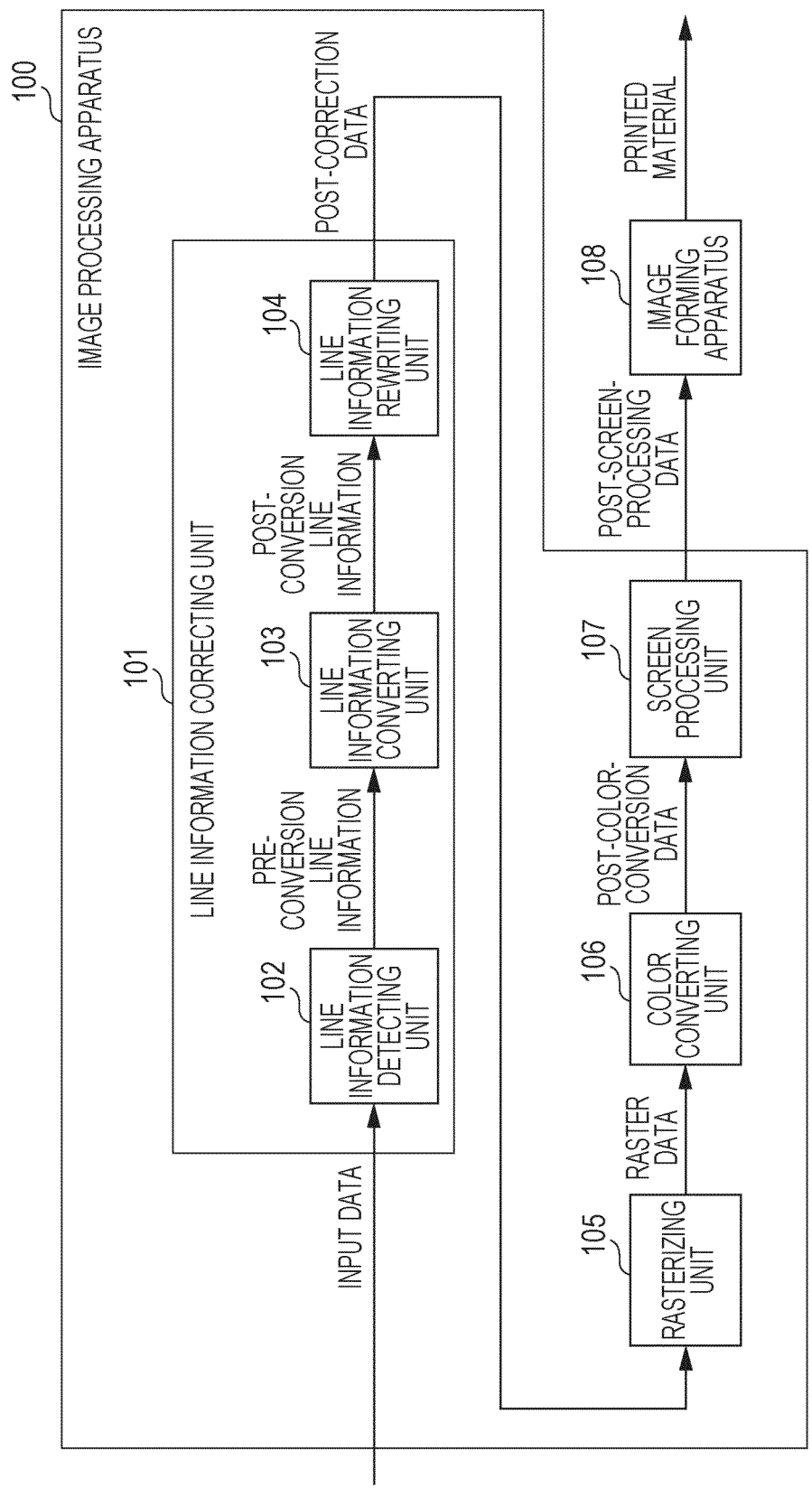
FIG. 1 is a block diagram showing the configuration of an image forming system.

FIG. 1 is a block diagram showing the configuration of an image forming system that can be used in this embodiment. The image forming system of this embodiment includes an image processing apparatus 100 that performs image processing on input data, and an image forming apparatus 108 that forms images on recording media. The image processing apparatus 100 and the image forming apparatus 108 are connected by an interface or a circuit for wireless communications. The image processing apparatus 100 is a printer driver that is installed in a general-purpose personal computer, for example. In that case, the respective components in the image processing apparatus 100 described below are realized by the computer executing a predetermined program. However, the image forming apparatus 108 may include the image processing apparatus 100.

(Structure of the Image Processing Apparatus 100)

The image processing apparatus 100 includes a line information correcting unit 101, a rasterizing unit 105, a color converting unit 106, and a screen processing unit 107. The line information correcting unit 101 corrects line information included in input data, and outputs the line information as post-correction data to the rasterizing unit 105. The line information correcting unit 101 includes a line information detecting unit 102, a line information converting unit 103, and a line information rewriting unit 104. The line information correcting unit 101 detects, converts, and rewrites line information about each of the lines included in the input data. As used herein, the term "unit" generally refers to any combination of software, firmware, hardware, or other component that is used to effectuate a purpose.

The line information detecting unit 102 detects line information from input data. The detected line information about one line is output as pre-conversion line information to the line information converting unit 103. The input data is raster data or vector data containing raster data. In raster data, a line is expressed by the values of respective pixels. In vector data containing raster data, a line can be expressed by two methods. In one case, a line is represented as raster data by the values of respective pixels. In the other case, a line is expressed as vector data by a start point, an end point, color information, a width, a degree of curve, a degree of discontinuity, and the like.

Examples of raster data include TIFF (Tagged Image File Format) and JPEG (Joint Photographic Experts Group). Examples of vector data containing raster data include application data such as W3C (World Wide Web Consortium) and SVG, and page description language data to be used for printing by a printer. Here, page description language data is printer control codes that instruct the printer to perform rendering. Examples of vector data containing raster data also include intermediate data called a display list in which objects are separated based on page description language data. The line information detecting unit 102 detects the color information about the line, the color information about the background of the line, and the width of the line, as the line information. The color information about the line and the color information about the background of the line may be represented by (R, G, B), (C, M, Y, K), (L*, a*, b*), (X, Y, Z), the spectral reflection factors of respective wavelengths, or the like.

The method of detecting line information from input data differs between a case where the line from which line information is to be detected is represented by raster data, and a case where the line is represented by vector data. In a case where the line is represented by vector data, the above mentioned line information is written as numerical values in the vector data, and therefore, the line information is detected by referring to the corresponding portion. Reference numeral 201 in FIG. 2 is an example of a line expressed by SVG. In this case, the detected color information about the line is (R, G, B)=(128, 128, 128), the detected color information about the background is (R, G, B)=(192, 192, 192), and the detected width of the line is 0.24 pt. In a case where the line is expressed by raster data, on the other hand, vector data is newly generated by vectorizing the line in the raster data with the use of a known technology, and line information is detected from the vector data by the above described method. The vector data to be generated through vectorization may be in any format.

The line information converting unit 103 converts line information based on pre-conversion line information. The line information converting unit 103 converts the color information about the line and the width of the line in the line information detected by the line information detecting unit 102, but does not convert the color information about the background of the line. The converted line information about the one line is output as post-conversion line information to the line information rewriting unit 104. In the line information converting unit 103, there are two methods of converting the pre-conversion line information.

According to a first method, the optimum values of post-conversion line information are calculated in real time through computation during an image processing operation. In the description below, the process to calculate the optimum values of post-conversion line information based on pre-conversion line information will be referred to as the optimum conversion value calculation process. This optimum conversion value calculation process will be described later in detail.

According to a second method, the optimum values corresponding to post-conversion line information are calculated through the optimum conversion value calculation process, and a line information conversion table is referred to in which the optimum values are associated as the post-conversion line information with the pre-conversion line information. FIG. 3 shows an example of a line information conversion table 301. For example, the row surrounded by a frame 302 indicates the correspondence relationship of pre-conversion line information in which the color information about the line is (R, G, B)=(128, 128, 128), the color information about the background is (R, G, B)=(192, 192, 192), and the width of the line is 0.24 pt. In this case, the color information about the line and the width of the line in the post-conversion line information are (R, G, B)=(64, 64, 64), and 0.12 pt, respectively. As described above, the color information about the background of the line is not converted. Therefore, in the line information conversion table 301, the color information about the background of lines is not written in the columns of the post-conversion line information.

Based on the post-conversion line information, the line information rewriting unit 104 rewrites the line information in the input data and in the vector data generated by the line information detecting unit 102. In a case where the line information in input data is rewritten, the line to be rewritten is entirely expressed by vector data. In the vector data, the line information is written as numerical values, and therefore, the line information is rewritten by substituting the numerical values in the line information based on the post-conversion line information. Reference numeral 202 in FIG. 2 indicates the result of rewriting of the line information 201 in FIG. 2 based on the post-conversion line information obtained from the line information conversion table shown in FIG. 3. The rewritten data is output as post-correction data to the rasterizing unit 105.

The rasterizing unit 105 rasterizes all the vector data contained in the post-correction data, and outputs raster data to the color converting unit 106. Here, raster data that correspond to R (red), G (green), and B (blue) is output.

The color converting unit 106 converts the input raster data into image data of the respective colorants provided in the image forming apparatus 108, and outputs the image data as post-color-conversion data of the respective colors to the screen processing unit 107. For example, RGB raster data is converted into C (cyan), M (magenta), Y (yellow), and K (black). The color converting unit 106 performs a color conversion process according to the expressions shown below. Here, C_LUT_3D, M_LUT_3D, Y_LUT_3D, and K_LUT_3D represent color conversion look-up tables that define one output value from three input values of R, G, and B.

$$C = C\_LUT\_3D(R,G,B) \quad (1)$$

$$M = M\_LUT\_3D(R,G,B) \quad (2)$$

$$Y = Y\_LUT\_3D(R,G,B) \quad (3)$$

$$K = K\_LUT\_3D(R,G,B) \quad (4)$$

The screen processing unit 107 performs screen processing on the input post-color-conversion data, and generates raster data that is formed with a number of bits that can be output from the image forming apparatus 108. The generated raster data is output as post-screen-processing data to the image forming apparatus 108. For example, in a case where the number of bits in the post-color-conversion data is 8 (256 values), and the number of bits the image forming apparatus 108 can output is 1 bit (binary), the screen processing unit 107 performs processing according to the expressions shown below.

$$\text{Where } K \leq Th\_K, O\_K = 0 \quad (5)$$

$$\text{Where } K > Th\_K, O\_K = 1 \quad (6)$$

Figure 4:
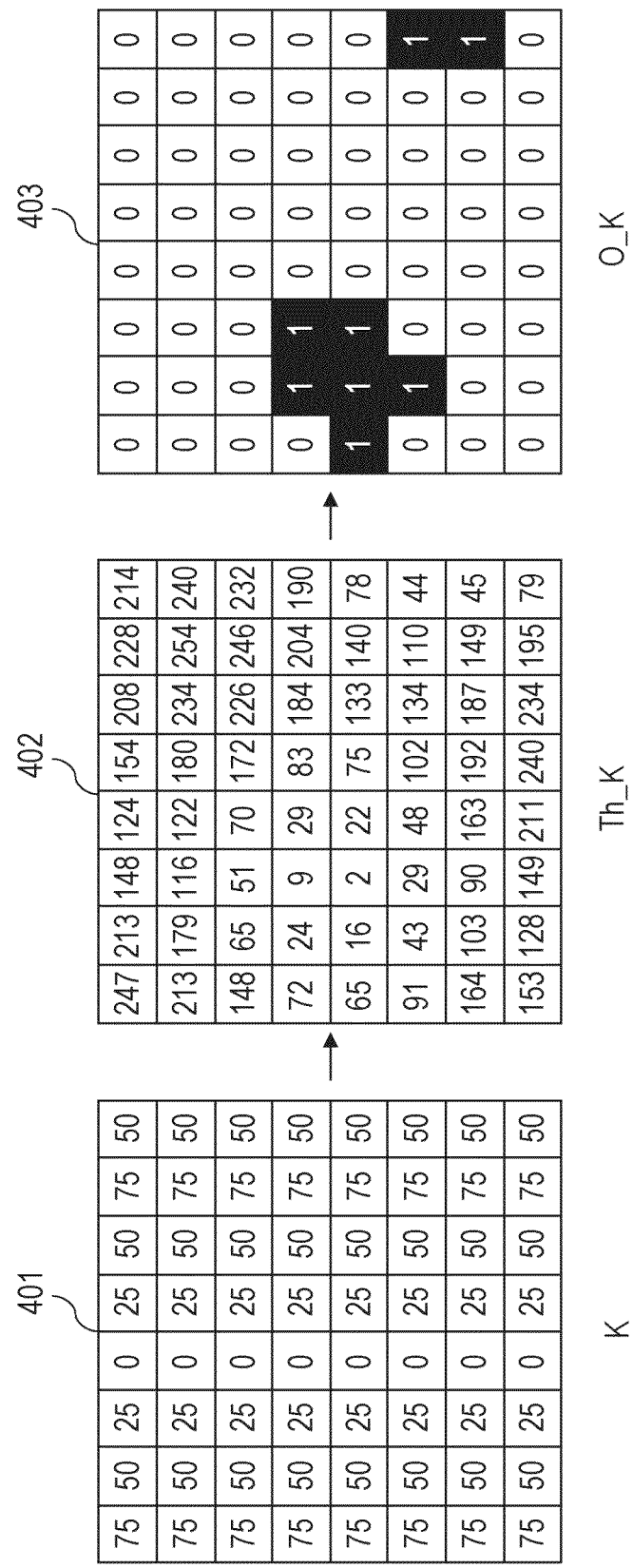
FIG. 4 is a diagram for explaining the outline of screen processing.

Here, K represents the pixel value of the pixels forming the post-color-conversion data corresponding to black, Th_K represents the threshold value in the threshold table, and O_K represents the output value forming the post-screen-processing data. FIG. 4 shows an example of the screen processing according to the expressions (5) and (6). The post-color-conversion data formed with pixel values of 256 values is compared with the threshold value, and is converted into the post-screen-processing data formed with 0 or 1. Although the details of the processing for black have been described above as an example, the details of processing for the other colors are the same as above.

(Structure of the Image Forming Apparatus)

Figure 5:
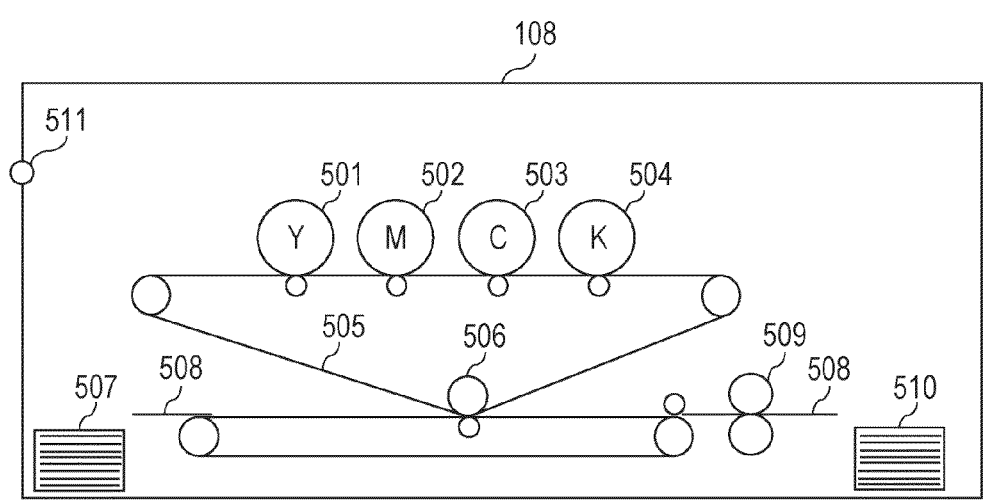
FIG. 5 is a block diagram showing the structure of the image forming apparatus 108.

The image forming apparatus 108 forms an image on a recording medium based on post-screen-processing data, and outputs a printed material. FIG. 5 shows a specific example structure of the image forming apparatus 108. Here, the image forming apparatus 108 is an electrophotographic recording apparatus. The image forming apparatus 108 includes photosensitive drums 501, 502, 503, and 504, which correspond to the respective colorants, an intermediate feeding belt 505, a transferring unit 506, a sheet feed tray 507, a fixing unit 509, and a sheet discharge tray 510. An input terminal 511 receives post-screen-processing data from the image processing apparatus 100. Latent images are formed on the photosensitive drums 501, 502, 503, and 504 by a laser scanner (not shown) based on the image data input from the input terminal 511. Images formed with the respective colorants of CMYK are developed on the respective photosensitive drums having the latent images formed thereon, and the images are sequentially transferred onto the intermediate feeding belt 505. As a result, a color toner image is formed on the intermediate feeding belt 505. At the transferring unit 506, the full-color image is transferred onto a recording medium 508 supplied from the sheet feed tray 507. The image transferred onto the recording medium 508 is fixed by the fixing unit 509, and is sent as a printed material to the sheet discharge tray 510.

(Flow of Image Processing in the Image Processing Apparatus)

Figure 6:
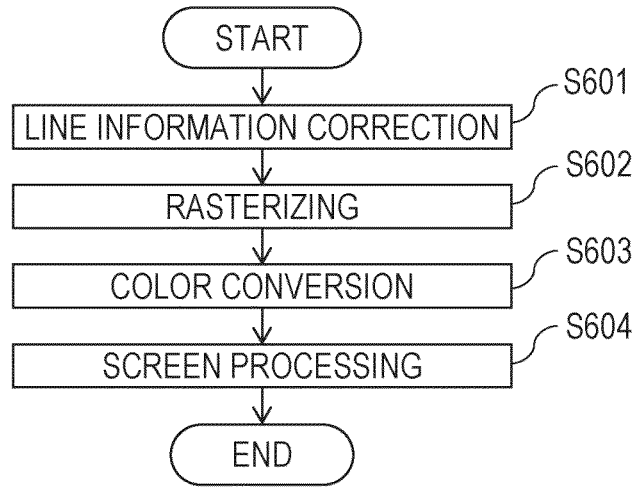
FIG. 6 is a flowchart showing a flow of a process to be performed in the image processing apparatus.

FIG. 6 is a flowchart showing a flow of image processing to be performed by the image processing apparatus 100 in this embodiment. In step S601, the line information correcting unit 101 corrects the line information contained in input data, and outputs the line information as post-correction data to the rasterizing unit 105. In step S602, the rasterizing unit 105 rasterizes all the vector data contained in the post-correction data, and outputs raster data to the color converting unit 106. In step S603, the color converting unit 106 converts the color information about the input raster data into data corresponding to the colorants provided in the image forming apparatus 108, and outputs the data as post-color-conversion data to the screen processing unit 107. In step S604, the screen processing unit 107 performs screen processing on the input post-color-conversion data, and generates raster data formed with bits that can be output from the image forming apparatus 108. The generated raster data is output as post-screen-processing data to the image forming apparatus 108.

(Optimum Conversion Value Calculation Process)

As described above, the process to calculate post-conversion line information based on pre-conversion line information is referred to as the optimum conversion value calculation process, and this process is now described in detail. This process may be performed in real time by the line information converting unit 103 during an image processing operation in some cases, and may be performed to create a line information conversion table prior to an image processing operation in the other cases. First, the definitions of symbols are described. As described above, in this embodiment, line information is formed with the color information about a line, the color information about the background of the line, and the width of the line. Of these pieces of information, the color information about the background of the line remains the same before and after a conversion, and therefore, the color information about the background is expressed as $(B_R, B_G, B_B)$. As for the pieces of information that change before and after the conversion, distinction is indicated by the subscripts "IN" and "OUT". That is, the color information about the line prior to the conversion is expressed as $(L_{R\_IN}, L_{G\_IN}, LB_{B\_IN})$, the width of the line prior to the conversion is expressed as $W_{IN}$, the optimum values of the color information about the line after the conversion is expressed as $(L_{R\_OUT}, L_{G\_OUT}, L_{B\_OUT})$, and the optimum value of the width of the line after the conversion is expressed as $W_{OUT}$. Although the color information about the line is expressed by (R, G, B) in this example, the color information about the line may be expressed by (C, M, Y, K), (L*, a*, b*), (X, Y, Z), the spectral reflection factors of respective wavelengths, or the like.

Figure 7:
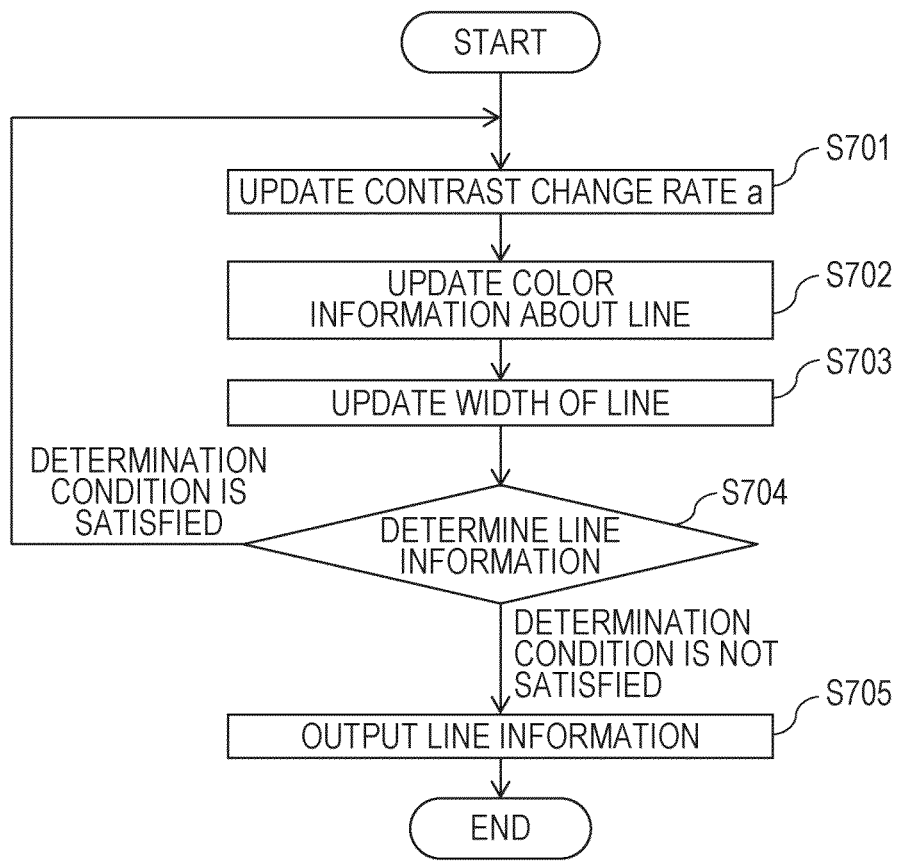
FIG. 7 is a flowchart showing the flow of an optimum conversion value calculation process.

Referring now to the flowchart shown in FIG. 7, the flow of the optimum conversion value calculation process is described. In step S701, the value of a contrast change rate a is updated. The contrast change rate a indicates the rate at which the line contrast that is the difference between the background color and the line color is to be changed. There are two methods of updating a contrast change rate: an increase mode and a decrease mode. Where the value prior to the update is $a_{n-1}$, and the value after the update is $a_n$, the value is updated according to the expression shown below in the increase mode, for example. In the description hereafter, the subscript n represents the number of updates.

$$a_n = a_{n-1} + 0.01 \quad (7)$$

In the decrease mode, on the other hand, the value is updated according to the expression shown below, for example.

$$a_n = a_{n-1} - 0.01 \quad (8)$$

In the expressions (7) and (8), the initial value $a_0$ is 1.00, for example. The increase mode and the decrease mode may be selected in any manner. For example, the image quality of a line is normally improved by increasing the contrast. Therefore, the target value of the contrast is set at the largest possible value, and the increase mode is normally selected. In a case where a higher image quality is achieved by lowering the contrast, however, the target value of the contrast may be exceptionally set at the smallest possible value, and the decrease mode may be selected. For example, in an image forming apparatus that is likely to cause a registration error between colors, the registration error becomes inconspicuous when the width of the line is made greater. Therefore, the mode for decreasing the contrast is selected, and the width of the line is increased. In the mode for decreasing the contrast, however, the line will be invisible if the contrast is decreased to the smallest value of 0. In view of this, a target contrast value must be set in the mode for decreasing the contrast. In this embodiment, the target contrast value is set at 30 in the mode for decreasing the contrast.

Figure 8:
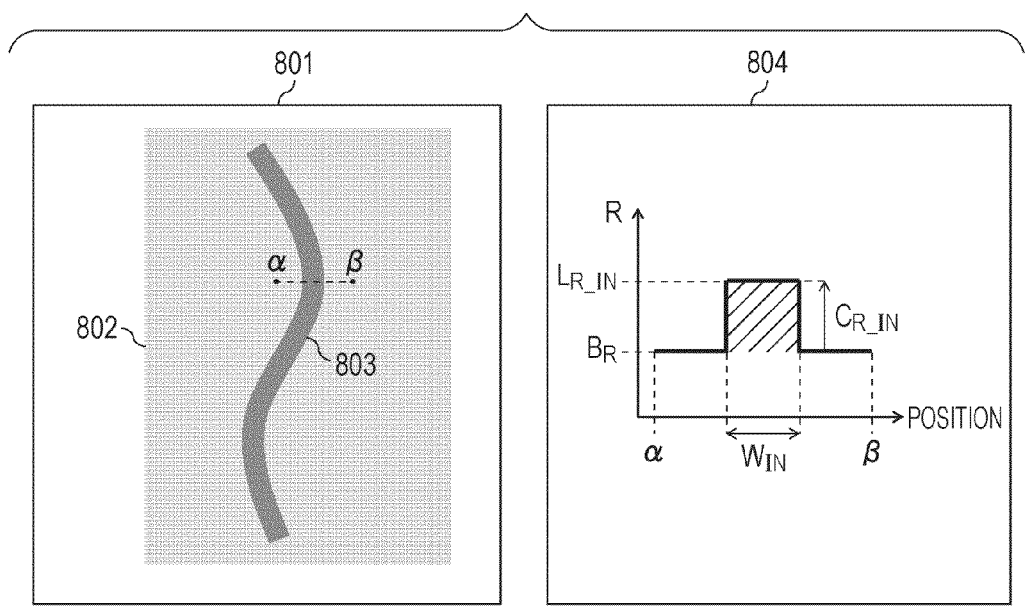
FIG. 8 is a schematic diagram for explaining the contrast of a line.

In step S702, the line contrast is changed based on the contrast change rate $a_n$ updated in step S701, and the color information about the line is updated. FIG. 8 is a schematic diagram for explaining the contrast of a line. An image 801 is an image including a line, and has a line 803 drawn as opposed to the background 802 of the line 803. A graph 804 shows the value of R of the color information (R, G, B) in a line segment αβ that intersects the center of the line 803 at a right angle. FIG. 8 shows a line image prior to a conversion, the value of R in the color information about the line is represented by $L_{R\_IN}$, the value of R in the color information about the background of the line is represented by $B_R$, and the width of the line is represented by $W_{IN}$. At this point, the value $C_{R\_IN}$ of R of the line contrast is calculated according to the expression shown below.

$$C_{R\_IN} = L_{R\_IN} - B_R \quad (9)$$

As shown above, the contrast of the line is calculated by subtracting the color information about the background of the line from the color information about the line on a color-by-color basis. Likewise, the value $C_{G\_IN}$ of G and the value $C_{B\_IN}$ of B of the line contrast can be calculated according to the expressions shown below (the color information about the line being represented by $L_{G\_IN}$ and $L_{B\_IN}$, the color information about the background of the line being represented by $B_G$ and $B_B$).

$$C_{G\_IN} = L_{G\_IN} - B_G \quad (10)$$

$$C_{B\_IN} = L_{B\_IN} - B_B \quad (11)$$

In the expressions (9), (10), and (11), the contrast ($C_{R\_IN}$, $C_{G\_IN}$, $C_{B\_IN}$) of the line prior to a conversion is calculated from the color information ($L_{R\_IN}$, $L_{G\_IN}$, $L_{B\_IN}$) about the line and the color information ($B_R$, $B_G$, $B_B$) about the background of the line prior to the conversion. In step S702, the contrast ($C_{R\_IN}$, $C_{G\_IN}$, $C_{B\_IN}$) of the line prior to the conversion is multiplied by the contrast change rate $a_n$, to calculate the contrast ($C_{R\_n}$, $C_{G\_n}$, $C_{B\_n}$) of the line after the update according to the expressions shown below.

$$C_{R\_n} = a_n \times C_{R\_IN} \quad (12)$$

$$C_{G\_n} = a_n \times C_{G\_IN} \quad (13)$$

$$C_{B\_n} = a_n \times C_{B\_IN} \quad (14)$$

The contrasts ($C_{R\_n}$, $C_{G\_n}$, $C_{B\_n}$) of the line after the update are then added to the color information ($B_R$, $B_G$, $B_B$) about the background of the line, to calculate the color information ($L_{R\_n}$, $L_{G\_n}$, $L_{B\_n}$) about the line after the update according to the expressions shown below.

$$L_{R\_n} = B_R + C_{R\_n} \quad (15)$$

$$L_{G\_n} = B_G + C_{G\_n} \quad (16)$$

$$L_{B\_n} = B_B + C_{B\_n} \quad (17)$$

In step S703, the width of the line is updated in such a manner as to maintain the direct-current (DC) components of the line. The DC components of the line are the values obtained by multiplying the width of the line by the contrast of the line on a color-by-color basis. The DC components are shown as the shaded portion in the graph 804. The DC components of the line are expressed as ($D_R$, $D_G$, $D_B$). The DC components ($D_R$, $D_G$, $D_B$) of the line are calculated by multiplying, on a color-by-color basis, the width $W_{IN}$ of the line prior to the conversion by the contrast ($C_{R\_IN}$, $C_{G\_IN}$, $C_{B\_IN}$) of the line prior to the conversion, according to the expressions shown below.

$$D_R = W_{IN} \times C_{R\_IN} \quad (18)$$

$$D_G = W_{IN} \times C_{G\_IN} \quad (19)$$

$$D_B = W_{IN} \times C_{B\_IN} \quad (20)$$

The DC components mentioned in a seventh embodiment and an eighth embodiment described later correspond to the size of the point of origin (frequency) when the target line is subjected to Fourier transform. However, the DC components mentioned in the first through fifth embodiments and a sixth embodiment do not correspond to the size of the point of origin (frequency 0) when the target line is subjected to Fourier transform in a case where the color information about the background of the line is not 0. For ease of explanation, the values obtained through the integration of the contrast in the above manner will be referred to as the DC components in the described hereafter.

In step S702, the contrast ($C_{R\_IN}$, $C_{G\_IN}$, $C_{B\_IN}$) of the line prior to the conversion is multiplied by the contrast change rate $a_n$, to update the color information about the line. Therefore, to maintain the DC components of the line, the width $W_{IN}$ of the line prior to the conversion should be divided by the contrast change rate $a_n$. Accordingly, the width $W_n$ of the line after the update is calculated by dividing the width $W_{IN}$ of the line prior to the conversion by the contrast change rate $a_n$ according to the expression shown below.

$$W_n = W_{IN} \div a_n \quad (21)$$

The DC components of the line after the update of the line information and the line width are as shown in the expressions below, and are the same as the values of the pre-conversion DC components of the line calculated according to the expressions (18), (19), and (20), as can be seen from the expressions below.

$$W_n \times C_{R\_n} = (W_{IN} \div a_n) \times (a_n \times C_{R\_IN}) = W_{IN} \times C_{R\_IN} \quad (22)$$

$$W_n \times C_{G\_n} = (W_{IN} \div a_n) \times (a_n \times C_{G\_IN}) = W_{IN} \times C_{G\_IN} \quad (23)$$

$$W_n \times C_{B\_n} = (W_{IN} \div a_n) \times (a_n \times C_{B\_IN}) = W_{IN} \times C_{B\_IN} \quad (24)$$

In step S704, a check is made to determine whether the color information ($L_{R\_n}$, $L_{G\_n}$, $L_{N\_n}$) about the line after the update satisfies a determination condition. If the determination condition is satisfied, the process returns to step S701. If the determination condition is not satisfied, the process moves on to step S705. The determination condition is that the color information ($L_{R\_n}$, $L_{G\_n}$, $L_{B\_n}$) about the line after the update is not outside the range of possible values. For example, in a case where color information is expressed by (R, G, B), and the values of the respective colors are expressed by eight bits, the range of the possible values of the color information is from 0 to 255. In this case, if the value of one of the colors in the color information ($L_{R\_n}$, $L_{G\_n}$, $L_{B\_n}$) about the line after the update is smaller than 0 or is larger than 255, the color information is outside the range of the possible values, and therefore, is determined not to satisfy the determination condition. In the mode for decreasing the line contrast, the determination condition further includes a condition that the post-update line contrast ($C_{R\_n}$, $C_{G\_n}$, $C_{B\_n}$) defined by the expressions (12) through (14) has reached a predetermined target value. Specifically, in the mode for decreasing the line contrast, the process moves on to step S705 after one of the values of the line contrast ($C_{R\_n}$, $C_{G\_n}$, $C_{B\_n}$) becomes smaller than 30. As a result, in the mode for decreasing the line contrast, the line can be prevented from becoming invisible due to too large a decrease in line contrast.

In step S705, the optimum values of the pre-conversion line information are selected based on the updated color information and the updated line width that satisfy the determination condition in step S704, and the optimum values are output as the color information ($L_{R\_OUT}$, $L_{G\_OUT}$, $L_{B\_OUT}$) after the conversion and the width $W_{OUT}$ of the line after the conversion. In a case where the mode for increasing the contrast change rate is selected in step S701, the line color information and the line width with which the line contrast becomes highest among the updated color information and the updated color width are output. That is, in the increase mode in this embodiment, the DC components of the line are not changed, but the color information about the line and the width of the line are converted so that the contrast of the line has the largest possible values. In a case where the mode for decreasing the contrast change rate is selected in step S701, on the other hand, the color information about the line and the line width having the lowest line contrast within the range of values larger than the target value among the updated color information and the updated line width are output. That is, in the decrease mode, the DC components of the line are not changed, but the color information about the line and the width of the line are converted so that the contrast of the line has the smallest possible values within the range of values larger than the target value.

The contrast of the line becomes higher or lower every time the number of updates increases. Therefore, in step S705, while the determination condition in step S704 is satisfied, the color information about the line and the width of the line with which the number of updates becomes largest are output as the optimum values ($L_{R\_OUT}$, $L_{G\_OUT}$, $L_{B\_OUT}$) and the line width $W_{OUT}$ corresponding to the pre-conversion line information. If the number of updates is n, and the determination condition is not satisfied in step S704, the process moves on to step S705. Therefore, the largest number of updates that satisfy the determination condition is n−1. Accordingly, the line color information ($L_{R\_(n-1)}$, $L_{G\_(n-1)}$, $L_{B\_(n-1)}$) and the line width $W_{(n-1)}$ are output as the optimum values ($L_{R\_OUT}$, $L_{G\_OUT}$, $L_{B\_OUT}$) of the color information about the line after the conversion, and the optimum value $W_{OUT}$ of the width of the line after the conversion.

Figure 10:
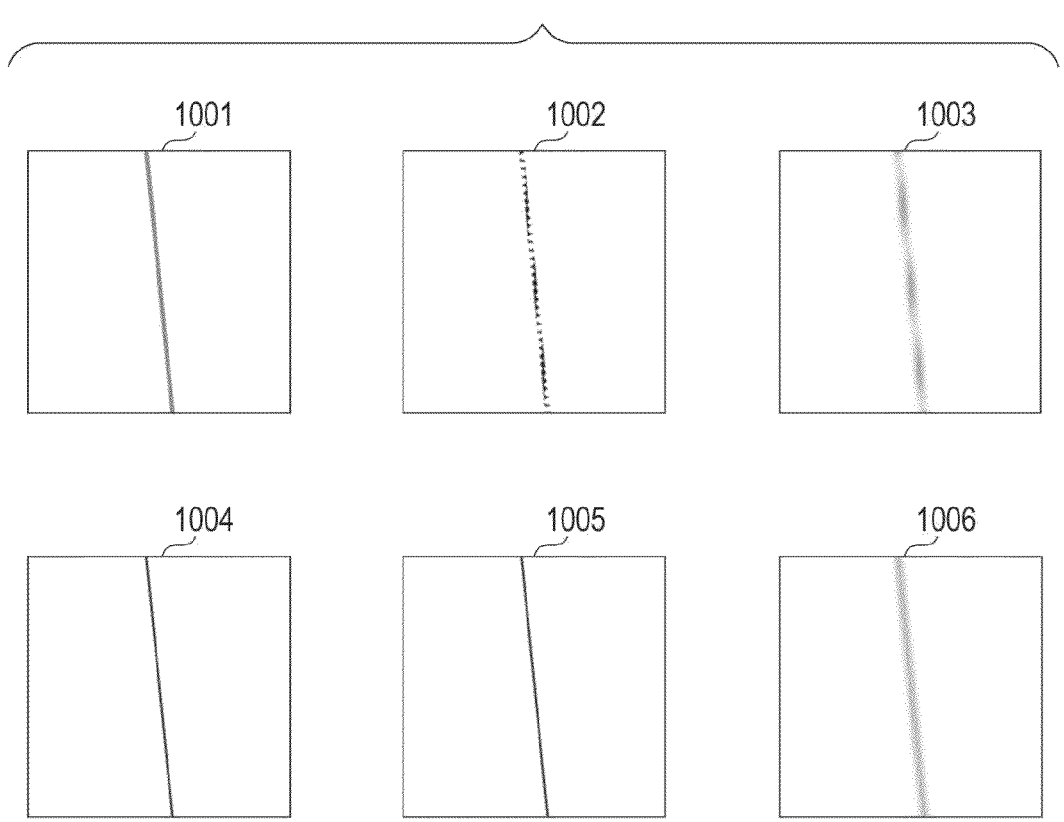
FIG. 10 is a diagram showing the effects of an embodiment.

With the structure described above, discontinuities of a line included in an image can be corrected by increasing or decreasing the contrast of the line. FIG. 10 is a diagram showing the effects of this embodiment. An image 1001 is raster data obtained by rasterizing input data of an image including a fine line at 2400 dpi, without the line information correction process being performed. As for the line in the input data, the width of the line is 0.24 pt, the color information about the line is 50%, and the color information about the background of the line is 0%. In this example, color information is expressed by one parameter, and the parameter range is from 0 to 100%, 0% being paper white, 100% being solid black. An image 1002 is a post-screen-processing image obtained by performing a 0-degree 150-line screen process on the image 1001 at 2400 dpi, and has discontinuities. An image 1003 is an image obtained by applying, to the image 1002, a low-pass filter that simulates the visual characteristics of a situation where the observation distance is 30 cm. This image 1003 is the image that is visually recognized by a person. As can be seen from the image 1003, the input data 1001 including the line have discontinuities that are visually recognized in the line as a result of the screen processing. The resolution of the image 1003 is 2400 dpi, and the low-pass filter that simulates the visual characteristics is a Gaussian filter that has six pixels as σ. An image 1004 is raster data obtained by rasterizing the input data including the line at 2400 dpi after the line information correction process of this embodiment is performed. Although the width of the line in the input data is 0.24 pt, the color information about the line is 50%, and the color information about the background of the line is 0%, the width of the line is adjusted to 0.12 pt, and the color information about the line is adjusted to 100% by the line information correction process. An image 1005 is a post-screen-processing image obtained by performing a 0-degree 150-line screen process on the image 1004 at 2400 dpi, and no discontinuities are formed in the line as can be seen from the drawing. This is because the color information about the line in the image 1004 is 100%, and the image is not changed by the screen processing. An image 1006 is an image obtained by applying, to the image 1005, a low-pass filter that simulates the visual characteristics of a situation where the observation distance is 30 cm, and no discontinuities are visually recognized in the line. With the structure described above, lines included in an image are appropriately corrected prior to screen processing, so that discontinuities that are likely to be formed in the lines due to the screen processing can be avoided.

Conventionally, the width of a line might appear greater than a desired width if the density of the line is changed. With the above described structure, on the other hand, the contrast of a line can be increased or decreased while the DC components of the line are maintained. Accordingly, the width of the line can be prevented from appearing greater than a desired width.

Second Embodiment

Although the width of a line is changed while the DC components of the line are maintained in the first embodiment, the image quality of the line can be made higher by changing the DC components of the line in some cases. In view of this, a second embodiment relates to a structure that can change the width of a line while maintaining post-correction DC components of the line after the DC components are changed. The structure in this embodiment is the same as the structure described in the first embodiment, except for the details of the process to update the width of a line in step S703 shown in FIG. 7. In the following description, explanation of the same components as those of the first embodiment will not be repeated.

First, post-correction DC components are described. Where a DC component change rate is represented by b, post-correction DC components ($D'_R$, $D'_G$, $D'_B$) are calculated by multiplying the expressions (18), (19), and (20) by b, according to the expressions shown below.

$$D'_R = W_{IN} \times C_{R\_IN} \times b \quad (25)$$

$$D'_G = W_{IN} \times C_{G\_IN} \times b \quad (26)$$

$$D'_B = W_{IN} \times C_{B\_IN} \times b \quad (27)$$

In step S702, the contrast ($C_{R\_IN}$, $C_{G\_IN}$, $C_{B\_IN}$) of the line prior to the conversion is multiplied by the contrast change rate $a_n$, to update the color information about the line. In view of this, to maintain the post-correction DC components, the width $W_{IN}$ of the line prior to the conversion should be divided by the contrast change rate $a_n$, and be then multiplied by the DC component change rate b. Therefore, the width $W_n$ of the line after the update can be calculated by dividing the width $W_{IN}$ of the line prior to the conversion by the contrast change rate $a_n$ and multiplying the result by the DC component change rate b, according to the expression shown below.

$$W_n = W_{IN} \div a_n \times b \quad (28)$$

The value of the DC component change rate b may be calculated in any manner. For example, it is difficult for a general electrophotographic image forming apparatus to reproduce a fine pattern with low contrast. In this case, the DC components are made larger by setting b at a larger value than 1, so that the width of the line can be increased, and the fineness of the pattern can be reduced while the contrast of the line is made higher. As a result, an excellent output result can be obtained. In a case where the width of the line is smaller than 0.24 pt, and the contrast of the line is lower than 50%, for example, the value of b is set at 1.2. In the other cases, the value of b is set at 1. If there is a line that has higher image quality when the DC components are small, the DC component change rate b for the line may be set at a smaller value than 1. With the above described structure, the image quality of lines can be further improved.

Third Embodiment

In the first embodiment, the width of a line is changed while the DC components of the line are maintained, so as to prevent the width of the line from appearing greater than a desired width when the contrast of the line is increased or decreased. If the change in the width of the line is too large, the width of the line appears different from the desired width in the image that is output on a recording medium based on post-screen-processing data, even though the DC components of the line are maintained. In a case where the viewing distance is approximately 30 cm, for example, even when the contrast and the width of the line are changed while the DC components of the line are maintained, the width of the line appears different from the desired width if the width of the line is changed by approximately 100 µm. In view of this, a third embodiment relates to a structure that can restrict a change in the width of a line from becoming too large.

The structure in this embodiment is the same as the structure described in the first embodiment, except for the details of the determination condition in step S704 shown in FIG. 7. In the first embodiment, the determination condition in step S704 is that the color information ($L_{R\_n}$, $L_{G\_n}$, $L_{B\_n}$) about the line after the update is not outside the range of the possible values. Hereinafter, this determination condition will be referred to as the first determination condition. In the third embodiment, another determination condition is to be used in addition to the first determination condition. Hereinafter, the newly added determination condition will be referred to as the second determination condition. In step S704 in the third embodiment, if the first determination condition and the second determination condition are simultaneously satisfied, the process returns to step S701. If the first determination condition and the second determination condition are not simultaneously satisfied, the process moves on to step S705.

The second determination condition is that a change in the width of a line is not larger than a predetermined allowable line width change $\Delta W_{MAX}$. The value of the allowable line width change $\Delta W_{MAX}$ is 100 µm, for example. A change in the width of a line is the absolute value $|W_{dn} - W_{IN}|$ of the difference between the width $W_n$ of the line measured when the number of updates is n and the width $W_{IN}$ of the line prior to the conversion. By additionally using such a determination condition, the absolute value $|W_{OUT} - W_{IN}|$ of the difference between the optimum width $W_{OUT}$ of the line after the conversion and the width $W_{IN}$ of the line prior to the conversion can be prevented from exceeding the allowable line width change $\Delta W_{MAX}$. That is, the change in the width of the line can be restricted from becoming too large.

The second determination condition added in this embodiment can also be applied to the structure described in the second embodiment. Although the value of the allowable line width change $\Delta W_{MAX}$ is 100 µm in this example, $\Delta W_{MAX}$ may be set at some other value. For example, in a case where a printed material is observed from a distance of 30 cm, the appropriate value of $\Delta W_{MAX}$ is about 100 µm. In a case where a printed material is observed from a distance of 60 cm, however, the appropriate value of $\Delta W_{MAX}$ is about 200 µm. In this manner, the value of the allowable line width change $\Delta W_{MAX}$ can be changed in accordance with the viewing distance. In a case where the width of the line is decreased, the value of $\Delta W_{MAX}$ may be restricted so that the width of the line becomes equal to or greater than the smallest line width that can be reproduced by a printer.

With the above described structure, the image quality of lines can be further improved.

Fourth Embodiment

A fourth embodiment relates to a structure that changes the width of a line and the color information about the line so that the visual difference between an ideal line and the line in an image that is output on a recording medium by the image forming apparatus 108.

An ideal line is the line that has the pre-conversion line information shown in FIG. 1 and is visually recognized in an image that is output by an ideal output apparatus. An ideal output apparatus is an output apparatus that is capable of precisely outputting a line having the pre-conversion line information shown in FIG. 1, such as a liquid crystal display or an offset printing machine. Meanwhile, an image that is output by the image forming apparatus 108 has reproducibility lowered by the screen processing as described above, and also has image quality degraded during the image forming process.

This embodiment differs from the first embodiment in the optimum conversion value calculation process, and, other than that, has the same structure as the structure described in the first embodiment.

In the optimum conversion value calculation process in the fourth embodiment, optimum values are calculated based on the result of a simulation of a line that is visually recognized. To realize this, the result of a simulation of an image in which an ideal line is visually recognized, and the result of a simulation of an image in which a line output from the image forming apparatus 108 is visually recognized are output. The DC component difference between the simulation results is set as an objective function, and the optimum values (post-conversion line information) are set as decision variables. Optimization is then performed by a known optimization method. The objective function will be described later in detail.

Specifically, the post-conversion line information to be the decision variables are the color information ($L_{R\_OUT}$, $L_{G\_OUT}$, $L_{B\_OUT}$) about the line after the conversion, and the width $W_{out}$ of the line after the conversion. The constraint condition is that those decision variables are not outside the ranges of possible values. For example, in a case where the color information is expressed by (R, G, B), and the value of each color is expressed by eight bits, the range of the possible values of the color information is from 0 to 255. In this case, if the value of one of the colors in ($L_{R\_OUT}$, $L_{G\_OUT}$, $L_{B\_OUT}$) is smaller than 0 or is larger than 255, the color information is determined to be outside the range of the possible values. If $W_{out}$ is 0, the line becomes invisible. Therefore, the possible values of $W_{out}$ are larger than 0 (unless the background is thick in color and the line is thin in color). The known optimization method to be used in the optimization may be any method, but may be a full search method, for example. In this case, the decision variables are allocated in all the combinations, and the optimum values of the decision variables that satisfy the constraint condition and minimize the value of the objective function are searched for.

Figure 9:
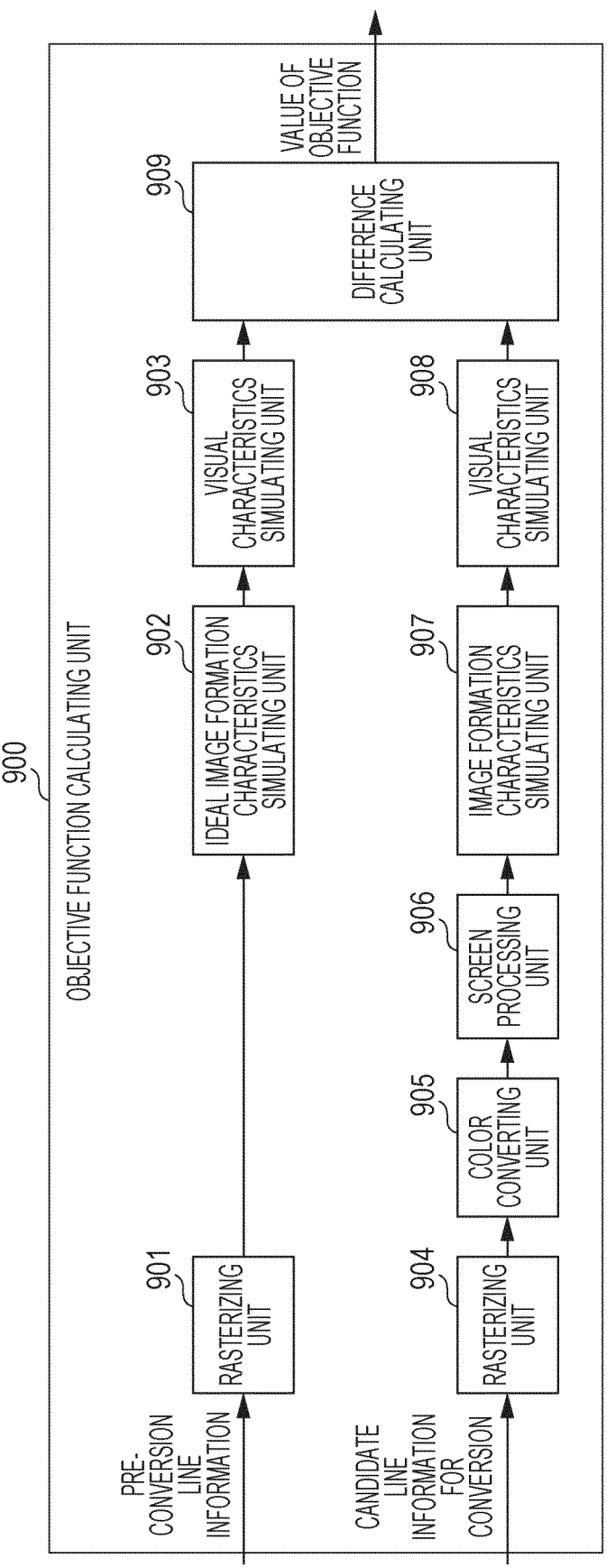
FIG. 9 is a block diagram showing the structure of an objective function calculating unit that calculates the value of an objective function.

The objective function is now described in detail. In the optimization to be performed in this embodiment, the objective function is the difference between the result of a simulation of an image in which an ideal line is visually recognized, and the result of a simulation of an image in which a line after output is visually recognized. FIG. 9 is a block diagram showing the structure of an objective function calculating unit 900 that calculates the value of the objective function.

A rasterizing unit 901 rasterizes a line prior to the conversion based on pre-conversion line information. Specifically, the pre-conversion line information is the color information ($L_{R\_IN}$, $L_{G\_IN}$, $L_{B\_IN}$) about the line, the color information ($B_R$, $B_G$, $B_B$) about the background of the line, and the width $W_{IN}$ of the line.

An ideal image formation characteristics simulating unit 902 simulates the image formation characteristics of an ideal output apparatus that is capable of precisely outputting a line having the pre-conversion line information, and outputs the values of (L*, a*, b*) of the ideal line. The values of (L*, a*, b*) are calculated by applying, to each pixel, a 3-input 1-output look-up table in which each of the output values of L*, a*, and b* are determined from three input values of (R, G, B).

A visual characteristics simulating unit 903 simulates an image in which the ideal line is visually recognized, by applying a low-pass filter to each of the channels of L*, a*, and b* in the image with the values of (L*, a*, b*) of the ideal line that are output from the ideal image formation characteristics simulating unit 902.

A rasterizing unit 904 rasterizes a candidate line for the conversion based on the color information about the background of the line ($B_R$, $B_G$, $B_B$) and the conversion candidate line information that is a candidate for post-conversion line information. In a case where the value of the objective function becomes smallest, the conversion candidate line information is output as the color information ($L_{R\_OUT}$, $L_{G\_OUT}$, $L_{B\_OUT}$) about the line after the conversion and the width $W_{OUT}$ of the line after the conversion.

A color converting unit 905 and a screen processing unit 906 perform the same processes as the color converting unit 106 and the screen processing unit 107 described in the first embodiment.

An image formation characteristics simulating unit 907 simulates the image formation characteristics of the image forming apparatus 108, and outputs the values of (L*, a*, b*) of the line after output. For example, a low-pass filter is applied to each of the channels in the post-screen-processing image of (C, M, Y, K) that is output from the screen processing unit 906. The values of (L*, a*, b*) of the line after output are output by applying, to each pixel, a 4-input 1-output look-up table in which each of the output values of L*, a*, and b* are determined from four input values of (C, M, Y, K).

A visual characteristics simulating unit 908 simulates an image in which the line after the output is visually recognized, by applying a low-pass filter to each of the channels of L*, a*, and b* in the image with the values of (L*, a*, b*) of the line after output that are output from the image formation characteristics simulating unit 907.

A difference calculating unit 909 performs Fourier transform on the image output from the visual characteristics simulating unit 903 and the image output from the visual characteristics simulating unit 908, to calculate the DC components of the respective images. The difference calculating unit 909 then outputs the difference between the absolute values of the two DC components as the value of the objective function. The value of the objective function may be any value, as long as the difference between the image output from the visual characteristics simulating unit 903 and the image output from the visual characteristics simulating unit 908 can be evaluated based on the value. For example, the color difference between the image output from the visual characteristics simulating unit 903 and the image output from the visual characteristics simulating unit 908 is calculated for each pixel, and the total of the color differences with respect to all the pixels may be used as the value of the objective function.

With the above described structure, the width of a line and the color information about the line can be changed so as to minimize the visual difference between an ideal line image and a line image that is actually output from the image forming apparatus 108. As a result, the image quality of lines can be further improved.

Fifth Embodiment

In the foregoing embodiments, the image quality of a line is improved by changing the width of the line and the color information about the line. A fifth embodiment, a seventh embodiment, and an eighth embodiment, which will be described below, relate to structures that can improve the image quality of a line by changing the stroke information about the line and the color information about the line. The stroke information about the line will be described later in detail. This embodiment differs from the foregoing embodiments in the respective processes to be performed by the line information detecting unit 102. Explanation of the same components as those of the foregoing embodiments will not be repeated.

Figure 14:
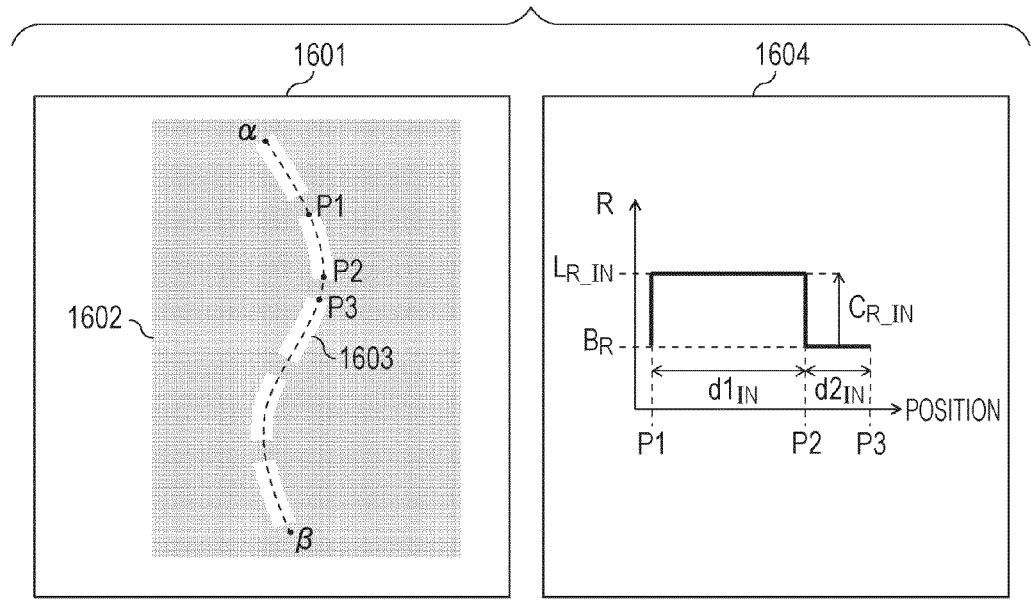
FIG. 14 is a schematic diagram for explaining the contrast of a line.

In this embodiment, the line information detecting unit 102 detects the color information about a line, the color information about the background of the line, and the stroke information about the line, as the line information detected from input data. The stroke information about the line is now described. An image 1601 shown in FIG. 14 is an image including a dashed line 1603, and the dashed line 1603 is drawn over the background 1602 of the dashed line 1603. A curved line αβ extends through the center of the width of the dashed line 1603, and P1, P2, and P3 represent points in the curved line αβ. A graph 1604 shows the value of R in the color information (R, G, B) in the curved line αβ. Here, the value of R in the color information about the line is represented by $L_{R\_IN}$, and the value of R in the color information about the background of the line is represented by $B_R$. The stroke information about the line is formed with the two parameters: the length of a stroke and the interval between strokes. The length of a stroke is the length of a continuous portion of the line, and is the distance $d1_{IN}$ from P1 to P2 in FIG. 14. The interval between strokes is the length of a discontinuous portion of the line, and is the distance $d2_{IN}$ from P2 to P3 in the dashed line shown in FIG. 14. In a case where the line is expressed by vector data, the line information detecting unit 102 detects line information by referring to the corresponding portion. Data 1201 shown in FIG. 11 is an example of input data expressed by SVG. In this case, the detected color information about the line is (R, G, B)=(144, 144, 144), the detected color information about the background is (R, G, B)=(192, 192, 192), and there is no detected stroke information about the line. In a case where the line is expressed by raster data, on the other hand, vector data is newly generated by vectorizing the lines in the raster data with the use of a known technology, and line information is detected from the vector data by the above described method.

The line information converting unit 103 converts the line information based on pre-conversion line information. The line information to be converted is the color information about the line and the stroke information about the line, and the color information about the background of the line is not to be converted.

As in the foregoing embodiments, there are two methods of calculating post-conversion line information from pre-conversion line information. According to a first method, an optimum conversion value calculation process is performed in real time during an image processing operation. The optimum conversion value calculation process in this embodiment will be described later in detail.

According to a second method, the optimum values of post-conversion line information are calculated through the optimum conversion value calculation process in advance, and a line information conversion table in which the corresponding pre-conversion line information is associated with the optimum values is referred to. FIG. 12 shows an example of the line information conversion table 1301 of this embodiment. The optimum values associated with pre-conversion line information are written as post-conversion line information. For example, the row surrounded by a frame 1302 indicates the correspondence relationship at the time when the color information about the line is (R, G, B)=(144, 144, 144), the color information about the background is (R, G, B)=(192, 192, 192), and there is no stroke information about the line prior to the conversion. In this case, the color information about the line after the conversion is (R, G, B)=(40, 40, 40). As for the stroke information about the line, the length of a stroke is 0.12 pt, and the interval between strokes is 0.36 pt. As described above, the color information about the background of the line is not converted. Therefore, the color information about the backgrounds of lines is not written in the columns of post-conversion line information in the line information conversion table 1301.

The line information rewriting unit 104 rewrites the line information in accordance with the post-conversion line information acquired by the line information converting unit 103. The input data 1201 shown in FIG. 11 is converted based on the correspondence relationship shown in the frame 1302 in FIG. 12. Data 1202 shown in FIG. 11 is the results of rewriting of the line information in the input data 1201. The converted color information about the background is (R, G, B)=(192, 192, 192), and the converted color information about the line is (R, G, B)=(0, 0, 0). As for the converted stroke information about the line, the length is 0.12 pt, and the interval is 0.36 pt.

(Details of the Optimum Conversion Value Calculation Process)

The optimum conversion value calculation process in this embodiment is now described in detail.

First, the definitions of symbols are described. As described above, the line information described in this embodiment is the color information about a line, the color information about the background of the line, and the stroke information about the line. The stroke information about the line is formed with the two parameters: the length of a stroke and the interval between strokes. The same symbols as above are used for the color information about the background of the line and the color information about the line. The stroke information about the line prior to the conversion is expressed as $(d1_{IN}, d2_{IN})$. The optimum values of the stroke information about the line after the conversion are expressed as $(d1_{OUT}, d2_{OUT})$. Although the color information about the line is expressed by (R, G, B) in this example, the color information about the line may be expressed by (C, M, Y, K), (L*, a*, b*), (X, Y, Z), the spectral reflection factors of respective wavelengths, or the like.

Figure 13:
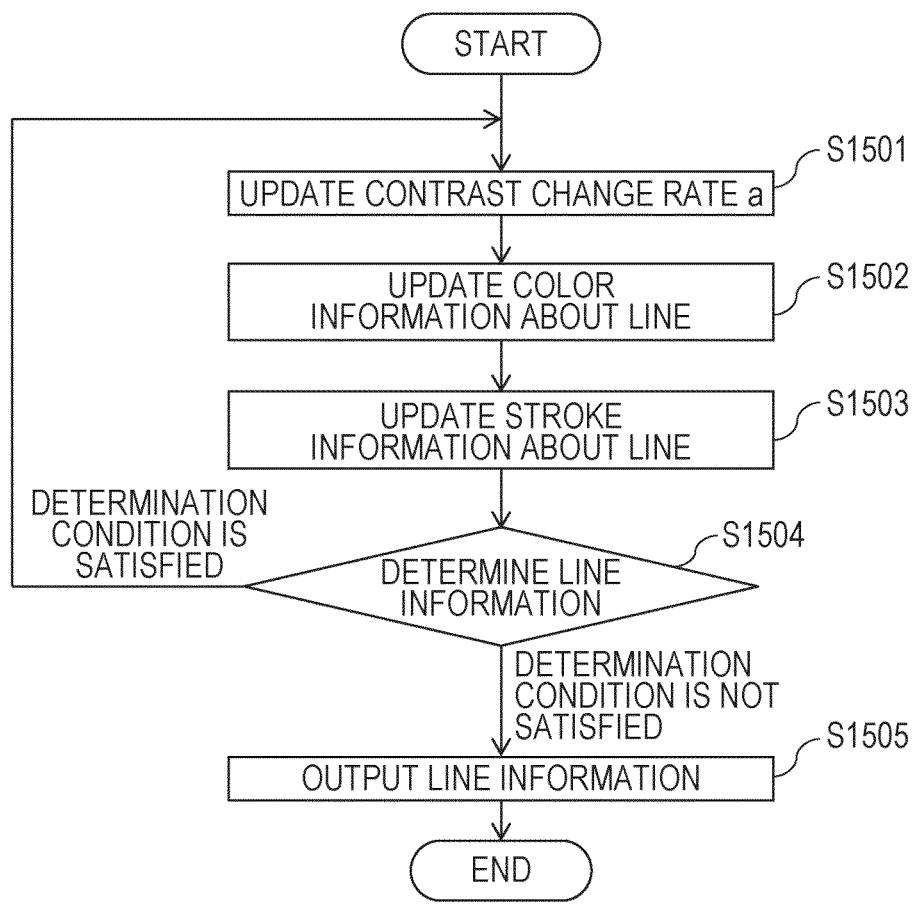
FIG. 13 is a flowchart showing the flow of an optimum conversion value calculation process.

FIG. 13 shows a flowchart of the optimum conversion value calculation process that can be performed in this embodiment. This flowchart differs from the flowchart shown in FIG. 7, in the processing in step S1503 and thereafter. Step S1501 is the same as step S701, and step S1502 is the same as step S702.

In step S1503, the stroke information about the line is updated while the DC components of the line are maintained. In the foregoing embodiments, the DC components of a line are the values obtained by multiplying the width of the line by the contrast of the line on a color-by-color basis. In this embodiment, on the other hand, the DC components of the line are the values obtained by multiplying a stroke ratio by the contrast of the line on a color-by-color basis. The stroke ratio is defined as the value obtained by dividing the above described length of the stroke by a stroke cycle. The stroke cycle is defined as the sum of the above described length of the stroke and the interval between strokes. In the case of the dashed line shown in FIG. 14, the stroke ratio $r_{IN}$ and the stroke cycle $T_{IN}$ are calculated according to the expressions (29) and (30) shown below. As shown in the pre-conversion line information in the frame 1302 in FIG. 12, when there is no stroke information about the line, the stroke ratio is 1, and the stroke cycle is undefined.

$$r_{IN} = d1_{IN} \div T_{IN} \tag{29}$$

$$T_{IN} = d1_{IN} + d2_{IN} \tag{30}$$

The DC components of the line are expressed as ($D_R$, $D_G$, $D_B$) corresponding to RGB, respectively. The DC components ($D_R$, $D_G$, $D_B$) are calculated by multiplying, on a color-by-color basis, the stroke ratio $r_{IN}$ prior to the conversion by the contrast ($C_{R\_IN}$, $C_{G\_IN}$, $C_{B\_IN}$) of the line prior to the conversion, according to the expressions (31), (32), and (33) shown below.

$$D_R = r_{IN} \times C_{R\_IN} \tag{31}$$

$$D_G = r_{IN} \times C_{G\_IN} \tag{32}$$

$$D_B = r_{IN} \times C_{B\_IN} \tag{33}$$

In step S1502, the color information about the line is updated by multiplying the contrast ($C_{R\_IN}$, $C_{G\_IN}$, $C_{B\_IN}$) of the line prior to the conversion by a contrast change rate $a_n$. Therefore, to maintain the DC components of the line, the stroke ratio $r_{IN}$ prior to the conversion should be divided by the contrast change rate $a_n$. Accordingly, the stroke ratio $r_n$ after the update is calculated by dividing the stroke ratio $r_{IN}$ prior to the conversion by the contrast change rate $a_n$, according to the expression shown below.

$$r_n = r_{IN} \div a_n \tag{34}$$

The stroke information ($d1_n$, $d2_n$) about the line after the update is calculated from the stroke ratio $r_n$ after the update and the stroke cycle $T_{OUT}$ after the conversion, according to the expressions (35) and (36).

$$d1_n = T_{OUT} \times r_n \tag{35}$$

$$d2_n = T_{OUT} - d1_n \tag{36}$$

If screen processing is performed on a line with low line contrast, the line and the screen processing cycle interfere with each other. As a result, large discontinuities are formed, and line reproducibility becomes lower. In view of this, the stroke cycle $T_{OUT}$ after the conversion is set beforehand at such a value that the discontinuities will become inconspicuous. In a case where a printed material is to be observed from a distance of 30 cm, for example, discontinuities will become inconspicuous if the stroke cycle is approximately 150 μm. Therefore, the value of $T_{OUT}$ is set at 150 μm. In a case where the stroke cycle $T_{IN}$ prior to the conversion is not undefined, the value of $T_{IN}$ may be used as the value of the stroke cycle $T_{OUT}$ after the conversion. Also, the number of tone levels that can be reproduced is substantially proportional to the product of the stroke cycle $T_{OUT}$ after the conversion and the resolution. Accordingly, in a case where an image is to be output with low resolution, the number of reproducible tone levels can be maintained by setting $T_{OUT}$ at a large value.

In the case of a line that is expected to appear a dashed line (the stroke cycle is longer than 200 μm, for example), the cycle is not changed, and the value of $T_{IN}$ is used as $T_{OUT}$.

The values of the DC components of the line after the update are calculated by multiplying the value of the stroke ratio after the update by the values of the contrast of the line after the update. The value of the stroke ratio after the update is as shown in the expression (34), and the values of the contrast of the line in the post-update line information are as shown in the expressions (12), (13), and (14). The results of the multiplication of those values are as shown in the expressions below, and, as can be seen from these expressions, the results are the same as the values of the DC components of the line prior to the conversion.

$$r_n \times C_{R\_n} = (r_{IN} \div a_n) \times (a_n \times C_{R\_IN}) = r_{IN} \times C_{R\_IN} \tag{37}$$

$$r_n \times C_{G\_n} = (r_{IN} \div a_n) \times (a_n \times C_{G\_IN}) = r_{IN} \times C_{G\_IN} \tag{38}$$

$$r_n \times C_{B\_n} = (r_{IN} \div a_n) \times (a_n \times C_{B\_IN}) = r_{IN} \times C_{B\_IN} \tag{39}$$

In step S1504, a check is made to determine whether the color information ($L_{R\_n}$, $L_{G\_n}$, $L_{B\_n}$) about the line after the update and the stroke ratio $r_n$ after the update satisfy a determination condition. If the determination condition is satisfied, the process returns to step S1501. If the determination condition is not satisfied, the process moves on to step S1505. The determination condition is that the color information ($L_{R\_n}$, $L_{G\_n}$, $L_{B\_n}$) about the line after the update is not outside the range of possible values, and the stroke ratio $r_n$ after the update is not outside the range of possible values. In a case where the color information is expressed by (R, G, B), and the value of each color is expressed by eight bits, the range of the possible values of the color information is from 0 to 255, for example. In this case, if the value of one of the colors in the color information ($L_{R\_n}$, $L_{G\_n}$, $L_{B\_n}$) about the line after the update is smaller than 0 or is larger than 255, the color information is outside the range of the possible values, and therefore, is determined not to satisfy the determination condition. The process then moves on to step S1505. The possible values of the stroke ratio $r_n$ are larger than 0 but not larger than 1. In this case, if the stroke ratio $r_n$ is 0 or lower, or is higher than 1, the stroke ratio $r_n$ is outside the range of the possible values, and therefore, is determined not to satisfy the determination condition. The process then moves on to step S1505.

In step S1505, the optimum values ($L_{R\_OUT}$, $L_{G\_OUT}$, $L_{B\_OUT}$) of the color information about the line prior to the conversion and the optimum values ($d1_{OUT}$, $d2_{OUT}$) of the stroke information are calculated from the post-update line information that satisfy the determination condition in step S1504. Of the post-update line information, the color information and the stroke information at the time when the contrast of the line becomes highest or lowest are set as the optimum values. The calculated optimum values are output as the color information and the stroke information about the line after the conversion. In a case where the mode for increasing the contrast change rate is selected in step S1501, the color information about the line and the stroke information about the line at the time when the contrast of the line becomes highest are output. In a case where the mode for decreasing the contrast change rate is selected in step S1501, on the other hand, the color information about the line and the stroke information about the line at the time when the contrast of the line becomes lowest are output.

If the number of updates is n, and the determination condition is not satisfied in step S1504, the process moves on to step S1505, as in the foregoing embodiments. The contrast of the line becomes higher or lower every time the number of updates increases. Therefore, the largest number of updates that satisfy the determination condition is n−1. Accordingly, the color information ($L_{R\_(n-1)}$, $L_{G\_(n-1)}$, $L_{B\_(n-1)}$) about the line is output as the color information ($L_{R\_OUT}$, $L_{G\_OUT}$, $L_{B\_OUT}$) about the line after the conversion, and the stroke information ($d1_{n-1}$, $d2_{n-1}$) about the line is output as the stroke information ($d1_{OUT}$, $d2_{OUT}$) about the line after the conversion.

Figure 15:
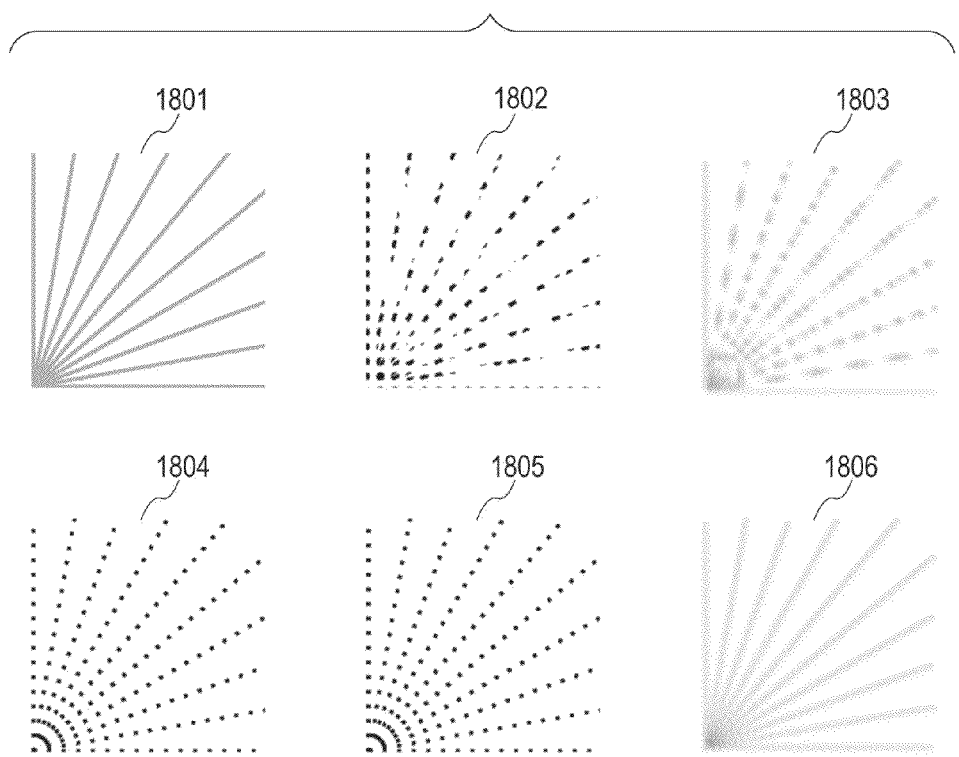
FIG. 15 is a diagram showing the effects of an embodiment.

With the above described structure, fine line reproducibility can be improved by increasing and decreasing the contrast of lines. FIG. 15 is a diagram showing the effects of this embodiment. An image 1801 is raster data obtained by rasterizing, at 2400 dpi, input data of an image including lines, without the line information correction process of this embodiment being performed. As for the fine lines in the image 1801, the color information about the lines is 25%, the color information about the background of the lines is 0%, and there is no stroke information about the lines. In this example, color information is expressed by one parameter, and the range of the parameter is from 0 to 100%, 0% being paper white, and 100% being solid black. An image 1802 is a post-screen-processing image obtained by performing a 0-degree 150-line screen process on the image 1801 at 2400 dpi. As can be seen from the drawing, the image 1802 has large discontinuities formed in some portions of the lines as a result of the screen processing. An image 1803 is an image obtained by applying, to the image 1802, a low-pass filter that simulates the visual characteristics of a situation where the observation distance is 30 cm. This image 1003 is the image that is visually recognized by a person. Discontinuities are also visually recognized in the image 1803. Meanwhile, an image 1804 is raster data obtained by rasterizing the input data including the line at 2400 dpi after the line information correction process of this embodiment is performed. In the image 1804, the color information about the line is adjusted to 100%, the length of the stroke is adjusted to 0.12 pt, and the interval between strokes is changed to 0.36 pt by the line information correction process described in this embodiment. An image 1805 is a post-screen-processing image obtained by performing a 0-degree 150-line screen process on the image 1804 at 2400 dpi. In the image 1805, dashed lines are observed, but degradation of the lines due to large discontinuities is smaller, as can be seen from the drawing. An image 1806 is an image obtained by applying, to the image 1805, a low-pass filter that simulates the visual characteristics of a situation where the observation distance is 30 cm. In the image 1806, almost no intervals between strokes in the lines are visually recognized, and lines with high reproducibility are output, as can be seen from the drawing. With the structure described above, the reproducibility of halftone fine lines can be improved.

Although the stroke information about lines is changed while the DC components of the lines are maintained in the fifth embodiment, the image quality of the lines may become higher where the DC components are changed as in the second embodiment. In such a case, the flowchart of the fifth embodiment shown in FIG. 13 should be executed after the DC components are corrected.

The fifth embodiment can also be applied to the same structure as that of the fourth embodiment.

Sixth Embodiment

In the third embodiment, the second determination condition is that the line width change $|W_n - W_{IN}|$ does not exceed the allowable line width change $\Delta W_{MAX}$. Under this condition, a restriction can be put on the line width difference to be visually recognized. However, this determination condition is not a condition that takes into account the human visual characteristics, though the line width change $|W_n - W_{IN}|$ does reflect the line width difference to be visually recognized.

In view of this, a sixth embodiment involves a line width evaluation function E that can evaluate the line width difference to be visually recognized, with the human visual characteristics being taken into account. The line width difference is restricted based on the line width evaluation function E. Specifically, the second determination condition is that the line width evaluation function E does not exceed a predetermined threshold value $E_{TH}$. The value of the threshold value $E_{TH}$ may be 0.2, for example. Under this condition, line reproducibility can be further improved. The structure to be described in this embodiment is the same as the structure described in the third embodiment, except for the second determination condition.

The line width evaluation function E is now described. This evaluation function is to evaluate the line width difference to be visually recognized between a pre-conversion line with a line width $W_{IN}$ and a post-conversion line with a line width $W_n$, taking into account the human visual characteristics. Therefore, the line width evaluation function E is formed with a quantity $X_{IN}(f)$ indicating the spectrum of the pre-conversion line, a quantity $X_n(f)$ indicating the spectrum of the post-update line, and a filter VTF(f) indicating visual characteristics. Here, f represents spatial frequency, with its unit being (cycle/mm). The expressions shown below are used for the line width evaluation function E, for example.

[Mathematical Formula 1]

$$E = \int \{X_{IN}(f)VTF(f) - X_n(f)VTF(f)\}^2 df \quad (40)$$

[Mathematical Formula 2]

$$X_{IN}(f) = \frac{\sin(\pi W_{IN} f)}{\pi W_{IN} f} \quad (41)$$

[Mathematical Formula 3]

$$X_n(f) = \frac{\sin(\pi W_n f)}{\pi W_n f} \quad (42)$$

[Mathematical Formula 4]

$$VTF(f) = 5.05\exp(-0.138\alpha f)\{1 - \exp(-0.1\alpha f)\} \quad (43)$$

[Mathematical Formula 5]

$$\alpha = 2d \tan\left(\frac{\pi}{180} \times 0.5\right) \quad (44)$$

As described in the first embodiment, the pre-conversion line and the post-update line have the same DC components. Therefore, the quantity $X_{IN}(f)$ indicating the spectrum of the pre-conversion line and the quantity $X_n(f)$ indicating the spectrum of the post-conversion line shown in the expressions (41) and (42), respectively, do not take into account the DC components. The expression (43) is the Dooley's equation, which is specifically disclosed by R. P. Dooley and R. Shaw in "Noise Perception in Electro-photography", J. Appl. Photogr. Eng., 5, pp. 190-196 (1979). In the expression (44), α is the coefficient for converting the unit of spatial frequency from "cycle/mm" to "cycle/deg", and d represents the observation distance. The unit of the observation distance d is "mm", and the value of the observation distance is 300 mm in this example.

In the above described structure, the line correction range can be restricted, with the human visual characteristics being taken into account. However, calculations according to the expression (40) will lead to a large processing load. Therefore, values of the line width evaluation function E are calculated beforehand by allocating values to the widths $W_{IN}$ of pre-conversion lines and the widths $W_n$ of post-update lines prior to an image processing operation, and a table in which the calculated values are written can be referred to during the image processing operation. A table 1901 shown in FIG. 16 is an example of a line width change evaluation value table in which the values of the line width evaluation function E corresponding to the values $W_{IN}$ of pre-conversion lines and the values $W_n$ of post-update lines are written. During the image processing operation, any calculation according to the expression (40) is not performed, and a value of the line width evaluation function E is calculated by referring to this table. In a case where there is no value of the line width evaluation function E corresponding to the width $W_{IN}$ of a pre-conversion line and the width $W_n$ of a post-update line in the table, a value of the line width evaluation function E is calculated by an interpolation operation. As the table in which values of the line width evaluation function E are written in advance is referred to in the above described manner, the processing load can be reduced.

Seventh Embodiment

In the fifth embodiment, the image quality of a line is improved by changing the stroke information about the line and the color information about the line. In the seventh embodiment described below, on the other hand, the image quality of a line can be further improved by changing not only the stroke information about the line and the color information about the line but also the color information about the background of the line. This embodiment differs from the fifth embodiment in the respective processes to be performed by the line information converting unit 103. Explanation of the same components as those of the foregoing embodiments will not be repeated herein.

In this embodiment, the line information converting unit 103 converts line information based on pre-conversion line information obtained by the line information detecting unit 102 having the same structure as that of the fifth embodiment. Although the line information to be converted is the color information about a line and the stroke information about the line in the fifth embodiment, the color information about the background (the portions in which any line is not drawn in the dashed line portion) of the line is also to be converted in this embodiment.

As in the foregoing embodiments, there are two methods of calculating post-conversion line information from pre-conversion line information. According to a first method, an optimum conversion value calculation process is performed in real time during an image processing operation. The optimum conversion value calculation process in this embodiment will be described later in detail.

According to a second method, the optimum values of post-conversion line information are calculated through the optimum conversion value calculation process in advance, and a line information conversion table in which the corresponding pre-conversion line information is associated with the optimum values is referred to. FIG. 17 shows an example of the line information conversion table 2001 of this embodiment. The optimum values associated with pre-conversion line information are written as post-conversion line information. For example, the row surrounded by a frame 2002 indicates the correspondence relationship at the time when the color information about the line is (R, G, B)=(102, 102, 102), and the color information about the background is (R, G, B)=(51, 51, 51). In this case, the color information about the line after the conversion is (R, G, B)=(255, 255, 255), and the color information about the background of the line is (R, G, B)=(0, 0, 0). As for the stroke information about the line, the length of a stroke is 0.12 pt, and the interval between strokes is 0.24 pt.

The line information rewriting unit 104 rewrites the line information in accordance with the post-conversion line information acquired by the line information converting unit 103. Input data 2101 shown in FIG. 18 is converted based on the correspondence relationship shown in the frame 2002 in FIG. 17. Data 2102 shown in FIG. 18 is the results of rewriting of the line information in the input data 2101. The converted color information about the background is (R, G, B)=(0, 0, 0), and the converted color information about the line is (R, G, B)=(255, 255, 255). As for the converted stroke information about the line, the length is 0.12 pt, and the interval is 0.24 pt.

(Details of the Optimum Conversion Value Calculation Process)

The optimum conversion value calculation process in this embodiment is now described in detail.

First, the definitions of symbols are described. As described above, the line information described in this embodiment is the color information about a line, the color information about the background (the portions in which any line is not drawn in the dashed line portion) of the line, and the stroke information about the line. The same symbols as above as used for the color information about the line and the stroke information about the line. The color information about the background of the line prior to the conversion and the color information about the background of the line after the conversion are distinguished from each other by the subscripts "IN" and "OUT" in this embodiment. Specifically, the color information about the background of the line prior to the conversion is expressed as $(B_{R\_IN}, B_{G\_IN}, B_{B\_IN})$, and the color information about the background of the line after the conversion is expressed as $(B_{R\_OUT}, B_{G\_OUT}, B_{B\_OUT})$. Although the color information about the line is expressed by (R, G, B) in this example, the color information about the line may be expressed by (C, M, Y, K), (L*, a*, b*), (X, Y, Z), the spectral reflection factors of respective wavelengths, or the like.

In the fifth embodiment, the optimum values $(L_{R\_OUT}, L_{G\_OUT}, L_{B\_OUT})$ of the color information about the line and the optimum values $(d1_{OUT}, d2_{OUT})$ of the stroke information about the line are calculated so as to maintain the DC components $(D_R, D_G, D_B)$ of the line defined by the expressions (31), (32), and (33). In this embodiment, on the other hand, the optimum values $(D_{R\_OUT}, D_{G\_OUT}, L_{B\_OUT})$ of the color information about the line, the optimum values $(B_{R\_OUT}, B_{G\_OUT}, B_{B\_OUT})$ of the color information about the background of the line, and the optimum values $(d1_{OUT}, d2_{OUT})$ of the stroke information about the line are calculated so as to maintain the DC components $(D_R, D_G, D_B)$ defined by expressions (45), (46), and (47) shown below. It should be noted that $r_{IN}$ represents the stroke ratio defined by the expressions (29) and (30).

$$DR = r\text{IN} \times LR\_\text{IN} + (1-r\text{IN}) \times BR\_\text{IN} \quad (45)$$

$$DG = r\text{IN} \times LG\_\text{IN} + (1-r\text{IN}) \times BG\_\text{IN} \quad (46)$$

$$DB = r\text{IN} \times LB\_\text{IN} + (1-r\text{IN}) \times BB\_\text{IN} \quad (47)$$

Figure 19:
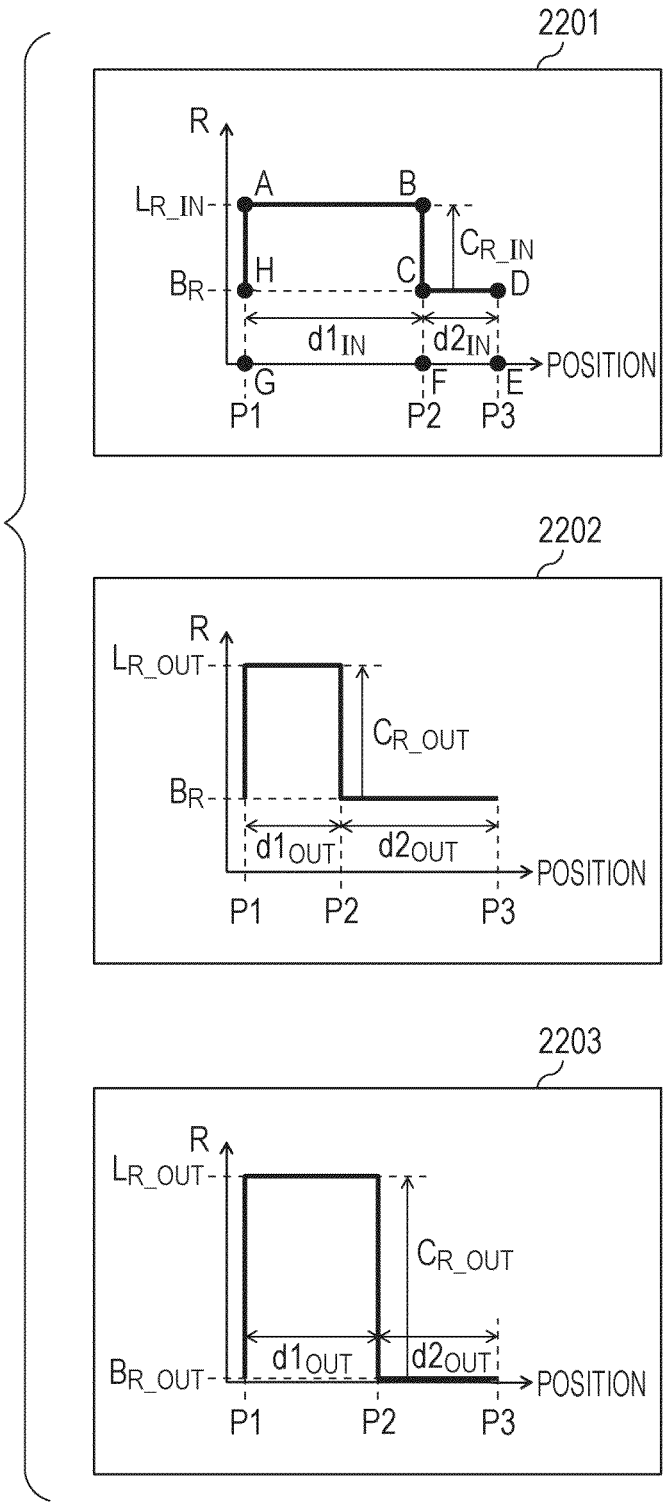
FIG. 19 is a schematic diagram for explaining the contrast of a line.

A graph 2201 in FIG. 19 shows the value of R in the color information (R, G, B) in the curved line αβ in the image 1601 shown in FIG. 14. In a case where the length from P1 to P3 is 1, and this length is set as the stroke repeating unit, the area of the portion surrounded by points A, B, C, and H represents the DC components in the fifth embodiment. In this embodiment, on the other hand, the area of the portion surrounded by points A, B, C, D, E, F, G, and H represents the DC components. In the fifth embodiment, only the color information about the line is converted as shown in a graph 2202 in FIG. 19. In this embodiment, on the other hand, the color information about the background (the portions in which any line is not drawn in the dashed line portion) of the line, as well as the color information about the line, is converted as shown in a graph 2203 in FIG. 19. As a result, the contrast of the line can be made higher, and the image quality of the line can be further improved. As can be seen from a comparison between the graph 2202 and the graph 2203 shown in FIG. 19, the contrast $C_{R\_OUT}$ of the line is higher in the graph 2203.

As in the foregoing embodiments, there are two optimization directions. One is the direction in which the contrast of the line defined by the expressions (9), (10), and (11) is maximized, and the other one is the direction in which the contrast of the line is minimized. In a case where the color information about the line and the color information about the background are expressed in the range of 0 to 255, the contrast of the line has the maximum value of 255 when the color information about the line and the color information about the background are 0 and 255, respectively, or are 255 and 0, respectively. Meanwhile, the minimum value of the contrast of the line is 0. In a case where there is no stroke information, or where the stroke ratio $r_{IN}$ is 1, the contrast of the line has the minimum value.

Figure 20:
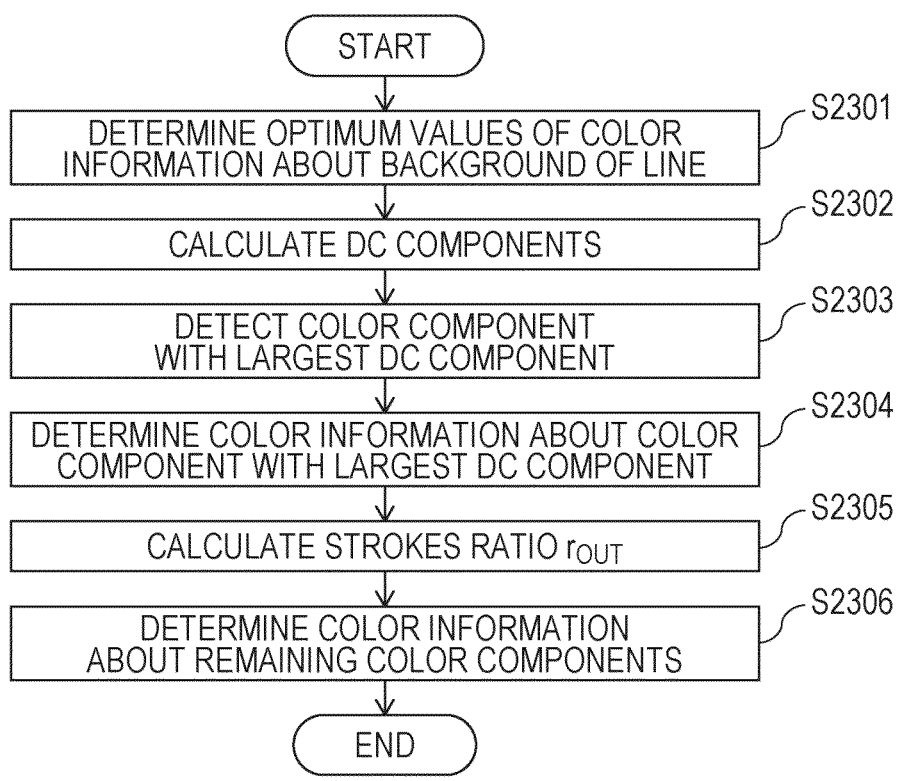
FIG. 20 is a flowchart showing the flow of an optimum conversion value calculation process.

First, the calculations of optimum values in a case where the contrast of the line is changed in the maximizing direction are described. FIG. 20 is a flowchart showing the flow of the process.

Since the DC components are maintained before and after the conversion, expressions (48) through (50) shown below are established. At this point, in step S2301, the optimum values ($B_{R\_OUT}$, $B_{G\_OUT}$, $B_{B\_OUT}$) of the color information about the background of the line after the conversion are determined to be (0, 0, 0). As a result, the expressions (48) through (50) each lose the second term on the right-hand side, and turn into expressions (51) through (53) shown below.

$$DR = r\text{IN} \times LR\_\text{IN} + (1-r\text{IN}) \times BR\_\text{IN} = r\text{OUT} \times LR\_\text{OUT} + (1-r\text{OUT}) \times BR\_\text{OUT} \quad (48)$$

$$DG = r\text{IN} \times LG\_\text{IN} + (1-r\text{IN}) \times BG\_\text{IN} = r\text{OUT} \times LG\_\text{OUT} + (1-r\text{OUT}) \times BG\_\text{OUT} \quad (49)$$

$$DB = r\text{IN} \times LB\_\text{IN} + (1-r\text{IN}) \times BB\_\text{IN} = r\text{OUT} \times LB\_\text{OUT} + (1-r\text{OUT}) \times BB\_\text{OUT} \quad (50)$$

$$DR = r\text{IN} \times LR\_\text{IN} + (1-r\text{IN}) \times BR\_\text{IN} = r\text{OUT} \times LR\_\text{OUT} \quad (51)$$

$$DG = r\text{IN} \times LG\_\text{IN} + (1-r\text{IN}) \times BG\_\text{IN} = r\text{OUT} \times LG\_\text{OUT} \quad (52)$$

$$DB = r\text{IN} \times LB\_\text{IN} + (1-r\text{IN}) \times BB\_\text{IN} = r\text{OUT} \times LB\_\text{OUT} \quad (53)$$

In a case where the optimum values ($B_{R\_OUT}$, $B_{G\_OUT}$, $B_{B\_OUT}$) of the color information about the background of the line after the conversion are determined to be (0, 0, 0) as described above, the stroke ratio $r_{OUT}$ after the conversion is made as low as possible, and the optimum values ($D_{R\_OUT}$, $L_{G\_OUT}$, $L_{B\_OUT}$) of the color information about the line are made as large as possible, so as to maximize the contrast of the line. If the stroke ratio $r_{OUT}$ can be changed on a color-by-color basis, the optimum values ($D_{R\_OUT}$, $L_{G\_OUT}$, $L_{B\_OUT}$) of the color information about the line are determined to be (255, 255, 255). The DC components ($D_R$, $D_G$, $D_B$) of the respective colors are then divided by 255, to calculate the stroke ratios for the respective colors. The optimum conversion value calculation process is thus completed.

In this embodiment, however, the stroke ratio $r_{OUT}$ cannot be set for the respective colors independently of one another. Therefore, if the stroke ratio $r_{OUT}$ is made too low, the color information about the line after the conversion might exceed the upper limit value of 255, depending on color components. In a case where the DC component $D_R$ of R is 102, and the DC component $D_G$ of G is 51, for example, the stroke ratio $r_{OUT}$ is 0.2 according to the expression (49) if the color information $L_{G\_OUT}$ about the line in G is determined to be 255. If the stroke ratio $r_{OUT}$ is 0.2, the color information $L_{R\_OUT}$ about the line in R is 510 according to the expression (48) and exceeds 255, which is the upper limit value of the color information. As described above, if the color information about a color component with a small DC component is determined to be 255, and the stroke ratio $r_{OUT}$ is calculated so as to maintain the DC component of the color component, the post-conversion color information about a color component with a larger DC component will exceed the upper limit value of 255.

To prevent this, the DC components ($D_R$, $D_G$, $D_B$) are calculated from the pre-conversion color information in step S2302, and the color component with the largest DC component is detected in step S2303. That is, the largest value among $D_R$, $D_G$, and $D_B$ is detected. In step S2304, the optimum value of the color information about the line in the color corresponding to the DC component having the largest value is determined to be 255. In a case where $D_R$ has the largest value among $D_R$, $D_G$, and $D_B$, for example, $L_{R\_OUT}$ is determined to be 255. In step S2305, the DC component having the largest value is divided by 255, to calculate the stroke ratio $r_{OUT}$. In this example, the DC component $D_R$ is divided by 255, to determine the stroke ratio $r_{OUT}$. In step S2306, the remaining DC components $D_G$ and $D_B$ are divided by the stroke ratio $r_{OUT}$, to calculate the optimum values $L_{G\_OUT}$ and $L_{B\_OUT}$. The optimum conversion value calculation process then comes to an end. In this example, $D_G$ and $D_B$ are smaller than $D_R$. Therefore, the optimum values $L_{G\_OUT}$ and $L_{B\_OUT}$ calculated by dividing those values by $r_{OUT}$ do not exceed 255, which is the upper limit value of the color information.

Next, the method of calculating optimum values when the contrast of the line is changed in the minimizing direction is described. To minimize the contrast of the line, the stroke information about the line is made non-existent, or the stroke ratio $r_{OUT}$ is adjusted to 1. In this case, the expressions (48) through (50) indicating the maintenance of the DC components each lose the second term on the right-hand side, and turn into expressions (54) through (56) shown below, and the optimum values ($L_{R\_OUT}$, $L_{G\_OUT}$, $L_{B\_OUT}$) of the color information about the line become equal to the DC components ($D_R$, $D_G$, $D_B$). Accordingly, the optimum conversion value calculation process is completed by calculating the DC components ($D_R$, $D_G$, $D_B$) from the pre-conversion color information, and setting $r_{OUT}$ at 1. Since the stroke ratio $r_{OUT}$ is 1, there is no need to calculate the optimum values ($B_{R\_OUT}$, $B_{G\_OUT}$, $B_{B\_OUT}$) of the color information about the background of the line.

$$DR = r\text{IN} \times LR\_\text{IN} + (1-r\text{IN}) \times BR\_\text{IN} = LR\_\text{OUT} \quad (54)$$

$$DG = r\text{IN} \times LG\_\text{IN} + (1-r\text{IN}) \times BG\_\text{IN} = LG\_\text{OUT} \quad (55)$$

$$DB = r\text{IN} \times LB\_\text{IN} + (1-r\text{IN}) \times BB\_\text{IN} = LB\_\text{OUT} \quad (56)$$

With the above described structure, the color information about the background (the portions in which any line is not drawn in the dashed line portion) of a line is also changed, so that the contrast of the line can be increased or decreased by a greater amount than in the fifth embodiment. Accordingly, the image quality of lines can be further improved.

Eighth Embodiment

In the seventh embodiment, a stroke ratio $r_{OUT}$ cannot be set for the respective colors independently of one another, and therefore, not all the colors can have the line contrast with the maximum value of 255 in some cases. In this embodiment, on the other hand, a stroke ratio $r_{OUT}$ is set for the respective colors independently of one another, so that all the color components can have the line contrast with the maximum value of 255. That is, in all the color components, the color information about the line has the maximum value of 255, and the color information about the background of the line has the minimum value of 0. Alternatively, in all the color components, the color information about a line has the minimum value of 0, and the color information about the background of the line has the maximum value of 255.

Although the line information conversion process is performed in a RGB space in the seventh embodiment, the line information conversion process is performed in a color space of the colorants to be used in an output by the image forming apparatus 108 in this embodiment. If the line contrast of all the color components is adjusted to the maximum value of 255 in a CMYK color space, there will be no change in the image even after the line is rasterized and is subjected to the screen processing at the screen processing unit 107. That is, according to this method, line discontinuities that are likely to be formed due to the screen processing can be completely prevented.

Figure 21:
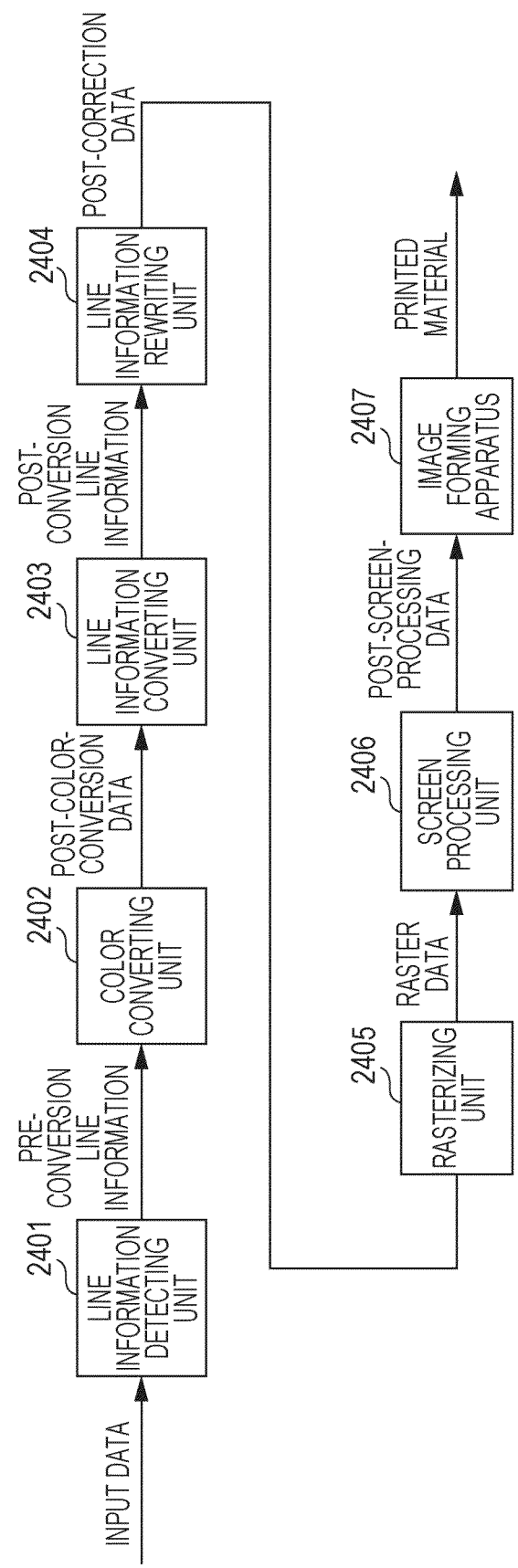
FIG. 21 is a diagram showing the configuration of an image forming system.

FIG. 21 is a block diagram showing the configuration of an image forming system that can be used in this embodiment. In FIG. 21, the structures of a line information detecting unit 2401, a line information rewriting unit 2404, a rasterizing unit 2405, a screen processing unit 2406, and an image forming unit 2407 are the same as the line information detecting unit 102, the line information rewriting unit 104, the rasterizing unit 105, the screen processing unit 107, and the image forming apparatus 108 shown in FIG. 1, respectively. Therefore, the structures of a color converting unit 2402 and a line information converting unit 2403 that are different from those shown in FIG. 1 are now described.

Line information that is detected by the line information detecting unit 2401 is input to the color converting unit 2402. As described above, the line information is color information about a line, color information about the background of the line, stroke information about the line, and the like.

The color information about the line and the color information about the background of the line may be expressed by (R, G, B), (C, M, Y, K), (L*, a*, b*), (X, Y, Z), the spectral reflection factors of respective wavelengths, or the like.

The color converting unit 2402 converts the color information about the line and the color information about the background of the line into color information about a color space of the colorants to be used in an output by the image forming apparatus 108. In a case where RGB color information is to be converted into C (cyan), M (magenta), Y (yellow), and K (black), for example, the color converting unit 2402 performs a color conversion process according to the expressions shown below. Here, C_LUT_3D, M_LUT_3D, Y_LUT_3D, and K_LUT_3D represent color conversion look-up tables that define one output value from three input values of R, G, and B.

$$C = C\_LUT\_3D(R,G,B) \quad (57)$$

$$M = M\_LUT\_3D(R,G,B) \quad (58)$$

$$Y = Y\_LUT\_3D(R,G,B) \quad (59)$$

$$K = K\_LUT\_3D(R,G,B) \quad (60)$$

Data 2502 shown in FIG. 22 is the results of a conversion of the color information in input data 2501 at the color converting unit 2402 according to the expressions (57) through (60). In this embodiment, one RGB dashed line is expressed by four dashed lines in the respective colors, so as to set stroke ratios $r_{OUT}$ for the respective colors independently of one another. That is, one dashed line is expressed by the same number of dashed line as the number of the colorants to be used in the output by the image forming apparatus 108. In the data 2502, four dashed lines in C (cyan), M (magenta), Y (yellow), and K (black) are expressed. In SVG, any color cannot be designated in a single-color space, but "gray" is used as the keyword for designating a color in a single-color space, for ease of explanation. The numerical values designated in "gray" are from 0 to 255, indicating a recording amount of the colorants. FIG. 22 shows a conversion of the color information (R, G, B)=(79, 43, 105) about the background of a line into (C, M, Y, K)=(207, 224, 54, 36), according to the expressions (57) through (60). FIG. 22 also shows a conversion of the color information (R, G, B)=(107, 146, 23) about the line into (C, M, Y, K)=(133, 56, 252, 41), according to the expressions (57) through (60).

The line information converting unit 2403 converts the color information about the line, the color information about the background of the line, and the stroke information about the line, as in the seventh embodiment. As in the foregoing embodiments, there are two methods of calculating post-conversion line information from pre-conversion line information. According to a first method, an optimum conversion value calculation process is performed in real time during an image processing operation. The optimum conversion value calculation process in this embodiment will be described later in detail.

According to a second method, the optimum values of post-conversion line information are calculated through the optimum conversion value calculation process in advance, and a line information conversion table in which the corresponding pre-conversion line information is associated with the optimum values is referred to. FIG. 23 shows an example of the line information conversion table 2601 of this embodiment. The optimum values associated with pre-conversion line information are written as post-conversion line information. For example, the row surrounded by a frame 2602 indicates the correspondence relationship at the time when the color information about the line is the data 2502 shown in FIG. 22. In this case, the color information about the line after the conversion is (C, M, Y, K)=(255, 255, 255, 255), and the color information about the background of the line is (C, M, Y, K)=(0, 0, 0, 0). The length of a stroke in C (cyan) is 0.26 pt, and the interval between strokes in C is 0.10 pt. The length of a stroke in M (magenta) is 0.24 pt, and the interval between strokes in M is 0.12 pt. The length of a stroke in Y (yellow) is 0.17 pt, and the interval between strokes in Y is 0.19 pt. The length of a stroke in K (black) is 0.05 pt, and the interval between strokes in M is 0.31 pt. Data 2503 in FIG. 22 is the results of rewriting of the line information in the data 2502 in FIG. 22 at the line information rewriting unit 2404 based on the correspondence relationship indicated in the frame 2602 in FIG. 23.

(Details of the Optimum Conversion Value Calculation Process)

The optimum conversion value calculation process in this embodiment is now described in detail.

First, the definitions of symbols are described. The same symbols as above are used for the color information about a line, the color information about the background of the line, and the stroke information about the line in this embodiment. A stroke ratio after the conversion is set for each color independently of the other colors in this embodiment. Therefore, the respective stroke ratios after the conversion are distinguished from one another by subscripts representing the color components. Specifically, the stroke ratios after the conversion are expressed as $(r_{C\_OUT}, r_{M\_OUT}, r_{Y\_OUT}, r_{X\_OUT})$.

As in the seventh embodiment, the optimum values $(L_{C\_OUT}, L_{M\_OUT}, L_{Y\_OUT}, L_{K\_OUT})$ of the color information about the line, the optimum values ($B_{C\_OUT}$, $B_{M\_OUT}$, $B_{Y\_OUT}$, $B_{K\_OUT}$) of the color information about the background of the line, and the optimum values of the stroke information about the line are calculated so as to maintain the DC components ($D_C$, $D_M$, $D_Y$, $D_K$) defined by expressions (61) through (64) shown below in this embodiment. It should be noted that the optimum values of the stroke information about the line are calculated from the stroke ratios ($r_{C\_OUT}$, $r_{M\_OUT}$, $r_{Y\_OUT}$, $r_{K\_OUT}$) in the same manner as above.

$$DC = rIN \times LC\_IN + (1-rIN) \times BC\_IN \quad (61)$$

$$DM = rIN \times LM\_IN + (1-rIN) \times BM\_IN \quad (62)$$

$$DY = rIN \times LY\_IN + (1-rIN) \times BY\_IN \quad (63)$$

$$DK = rIN \times LK\_IN + (1-rIN) \times BK\_IN \quad (64)$$

Figure 24:
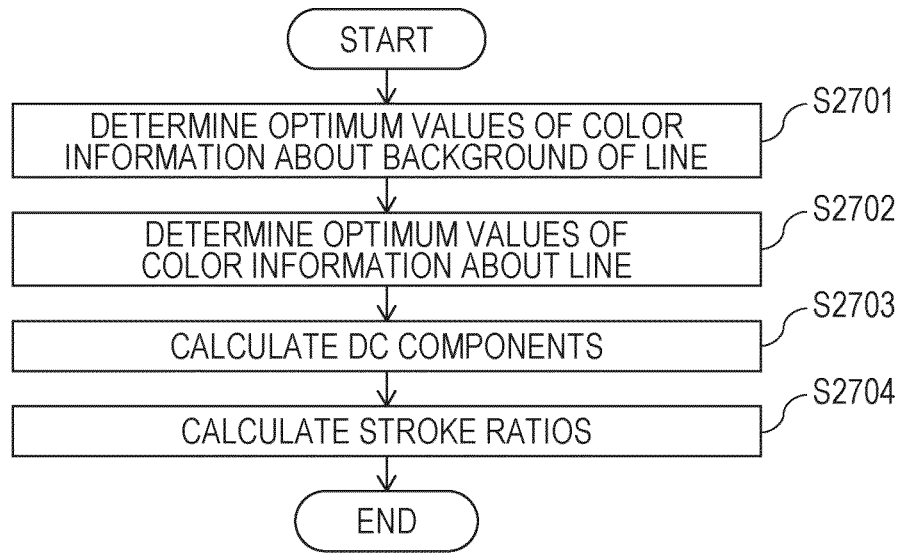
FIG. 24 is a flowchart showing the flow of an optimum conversion value calculation process.

As in the seventh embodiment, there are two optimization directions. One is the direction in which the contrast of the line is maximized, and the other one is the direction in which the contrast of the line is minimized. First, the calculations of optimum values in a case where the contrast of the line is changed in the maximizing direction are described. FIG. 24 is a flowchart showing the flow of the process.

Since the DC components are maintained before and after the conversion, expressions (65) through (68) shown below are established. At this point, in step S2701, the optimum values ($B_{C\_OUT}$, $B_{M\_OUT}$, $B_{Y\_OUT}$, $B_{K\_OUT}$) of the color information about the background of the line after the conversion are determined to be (0, 0, 0, 0). As a result, the expressions (65) through (68) each lose the second term on the right-hand side, and turn into expressions (69) through (72) shown below.

$$DC = rIN \times LC\_IN + (1-rIN) \times BC\_IN = rC\_OUT \times LC\_OUT + (1-rC\_OUT) \times BC\_OUT \quad (65)$$

$$DM = rIN \times LM\_IN + (1-rIN) \times BM\_IN = rM\_OUT \times LM\_OUT + (1-rM\_OUT) \times BM\_OUT \quad (66)$$

$$DY = rIN \times LY\_IN + (1-rIN) \times BY\_IN = rY\_OUT \times LY\_OUT + (1-rY\_OUT) \times BY\_OUT \quad (67)$$

$$DK = rIN \times LK\_IN + (1-rIN) \times BK\_IN = rK\_OUT \times LK\_OUT + (1-rK\_OUT) \times BK\_UT \quad (68)$$

$$DC = rIN \times LC\_IN + (1-rIN) \times BC\_IN = rC\_OUT \times gLC\_OUT \quad (69)$$

$$DM = rIN \times LM\_IN + (1-rIN) \times BM\_IN = rM\_OUT \times LM\_OUT \quad (70)$$

$$DY = rIN \times LY\_IN + (1-rIN) \times BY\_IN = rY\_OUT \times LY\_OUT \quad (71)$$

$$DK = rIN \times LK\_IN + (1-rIN) \times BK\_IN = rK\_OUT \times LK\_OUT \quad (72)$$

In a case where the optimum values ($B_{C\_OUT}$, $B_{M\_OUT}$, $B_{Y\_OUT}$, $B_{K\_OUT}$) of the color information about the background of the line after the conversion are determined to be (0, 0, 0, 0) as described above, the stroke ratios ($r_{C\_OUT}$, $r_{M\_OUT}$, $r_{Y\_OUT}$, $r_{K\_OUT}$) after the conversion are made as low as possible, and the optimum values ($L_{C\_OUT}$, $L_{M\_OUT}$, $L_{Y\_OUT}$, $L_{K\_OUT}$) of the color information about the line are made as large as possible, so as to maximize the contrast of the line. As the stroke ratios can vary with colors in this embodiment, the optimum values ($L_{C\_OUT}$, $L_{M\_OUT}$, $L_{Y\_OUT}$, $L_{K\_OUT}$) of the color information about the line are determined to be (255, 255, 255, 255) in step S2702. In step S2703, the DC components ($D_C$, $D_M$, $D_Y$, $D_K$) of the respective colors are calculated. In step S2704, the DC components ($D_C$, $D_M$, $D_Y$, $D_K$) of the respective colors are divided by 255, to calculate the stroke ratios ($r_{C\_OUT}$, $r_{M\_OUT}$, $r_{Y\_OUT}$, $r_{K\_OUT}$) for the respective colors. The optimum conversion value calculation process is thus completed.

Figure 25:
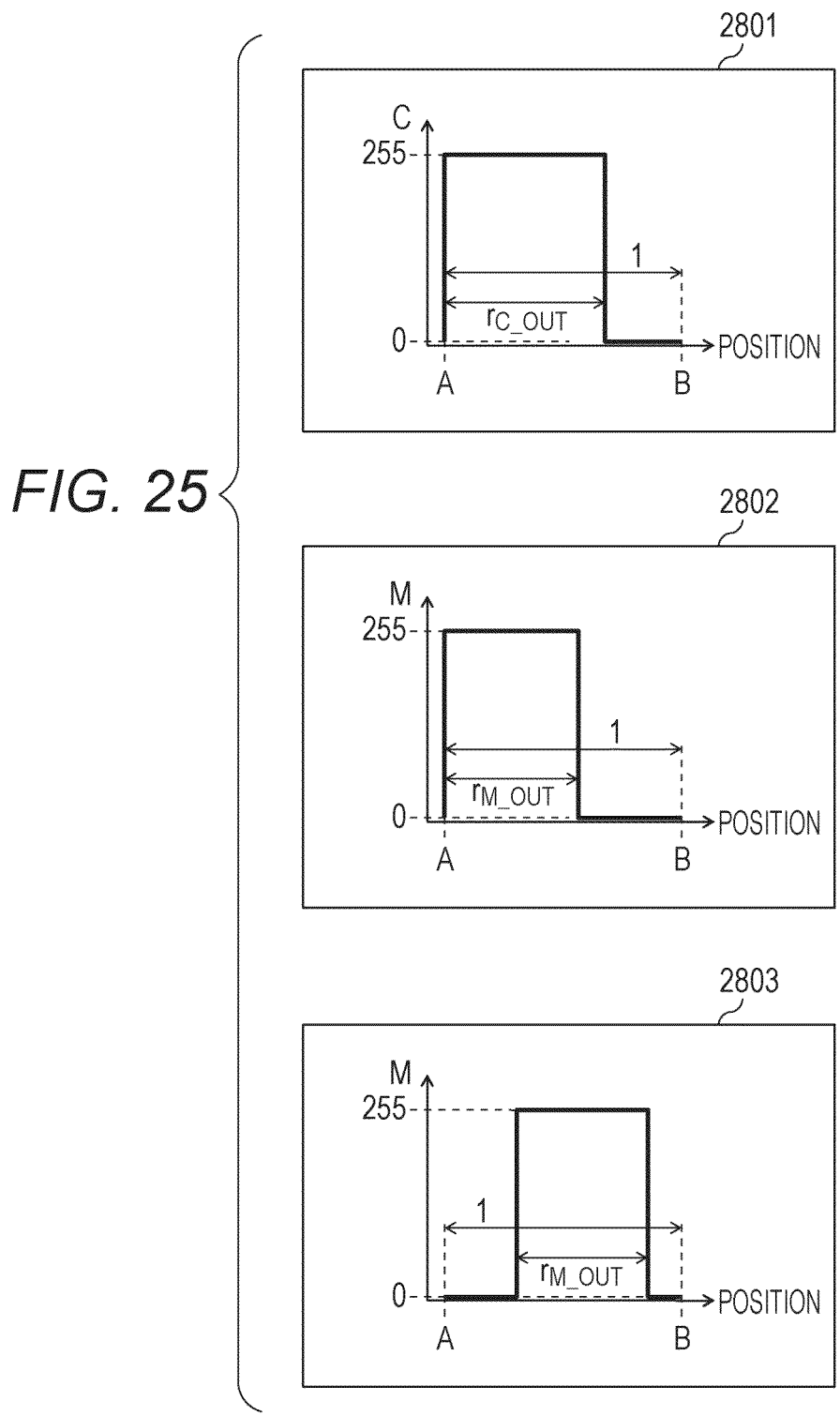
FIG. 25 is a schematic diagram for explaining the contrast of a line.

Like FIGS. 14 and 19, FIG. 25 shows the values of C and M in the color information (C, M, Y, K) in a dashed line. A and B represent positions in the dashed line, and the distance from A to B is 1, which is the stroke repeating unit. FIG. 25 shows an example of the line after the conversion, and graphs 2801 and 2802 correspond to C (cyan) and M (magenta), respectively. In the graphs 2801 and 2802, the portions of the respective dashed lines having the value of 255 start from the same position, which is A. In this embodiment, however, the start points of the dashed lines may be varied as shown in a graph 2803. In a case where the position of A is 0, and the position of B is 1, for example, the start point of C (cyan) may be 0, the start point of M (magenta) may be 0.25, the start point of Y (yellow) may be 0.5, and the start point of K (black) may be 0.75. As the start points of the dashed lines are made to vary among the colors in this manner, the portions to which no colorants are applied in the dashed lines can be reduced, and the image quality of the lines can be further improved.

Next, the method of calculating optimum values when the contrast of the line is changed in the minimizing direction is described. To minimize the contrast of the line, the stroke information about the line is made non-existent, or the stroke ratio $r_{OUT}$ is adjusted to 1. In this case, the expressions (65) through (68) indicating the maintenance of the DC components each lose the second term on the right-hand side, and turn into expressions (73) through (76) shown below, and the optimum values ($L_{C\_OUT}$, $L_{M\_OUT}$, $L_{Y\_OUT}$, $L_{K\_OUT}$) of the color information about the line become equal to the DC components ($D_C$, $D_M$, $D_Y$, $D_K$) Accordingly, the optimum conversion value calculation process is completed by calculating the DC components ($D_C$, $D_M$, $D_Y$, $D_K$) from the pre-conversion color information, and setting $r_{OUT}$ at 1. Since the stroke ratio $r_{OUT}$ is 1, there is no need to calculate the optimum values ($B_{C\_OUT}$, $B_{M\_OUT}$, $B_{Y\_OUT}$, $B_{K\_OUT}$) of the color information about the background of the line.

$$DC = rIN \times LC\_IN + (1-rIN) \times BC\_IN = LC\_OUT \quad (73)$$

$$DM = rIN \times LM\_IN + (1-rIN) \times BM\_IN = LM\_OUT \quad (74)$$

$$DY = rIN \times LY\_IN + (1-rIN) \times BY\_IN = LY\_OUT \quad (75)$$

$$DK = rIN \times LK\_IN + (1-rIN) \times BK\_IN = LK\_OUT \quad (76)$$

With the above described structure, the contrast of the line can have the maximum value of 255 for all the color components in a color space of the colorants to be used in the output by the image forming apparatus 108. Accordingly, there will be no change in the image even if the line is rasterized and is subjected to the screen processing at the screen processing unit 2406. That is, according to the method of this embodiment, line discontinuities that are likely to be formed due to the screen processing can be completely prevented.

Figure 26:
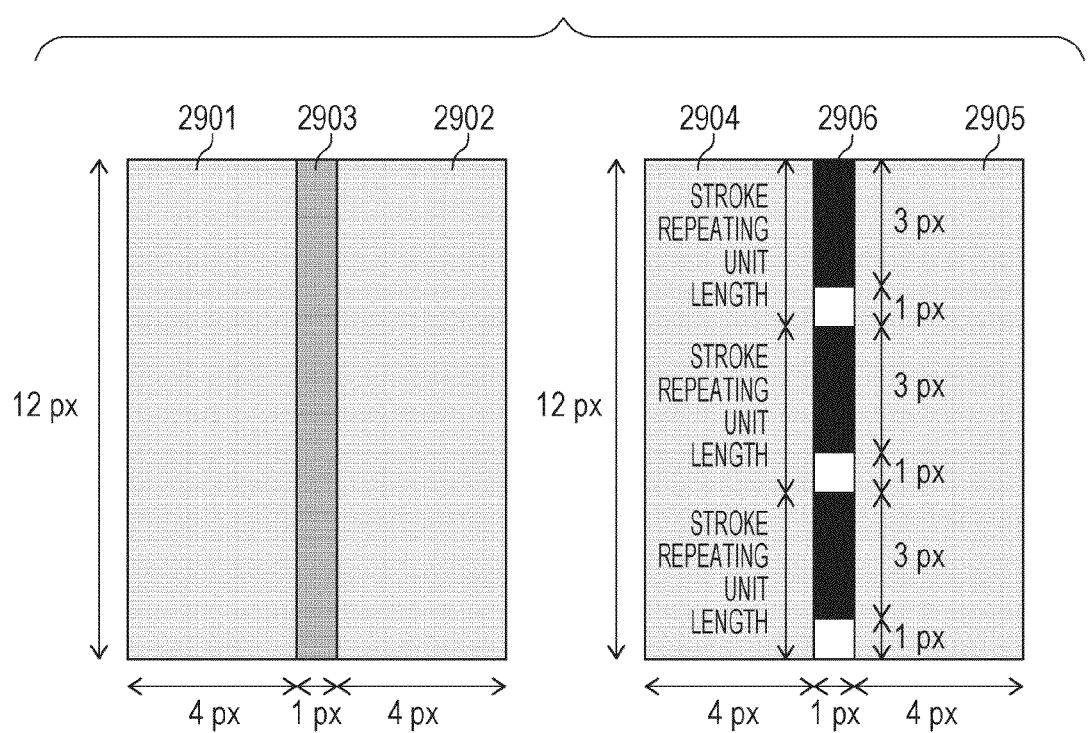
FIG. 26 is a diagram showing the effects of an embodiment.

FIG. 26 is a diagram showing the effects of this embodiment. For simplification, color information in this example is expressed by one parameter, and the range of the parameter is from 0 to 100%, 0% being paper white, and 100% being solid black. An image 2901 is an image to be input to the image processing apparatus described in this embodiment. Reference numeral 2902 indicates the image around a line, and the color information about the image 2902 is 25%. Reference numeral 2903 indicates the line to be converted. The color information about the line 2903 is 75%, and there is no stroke information about the line 2903.

Reference numeral 2904 indicates a pre-screen-processing image in which line information has been converted by the method of this embodiment. Reference numeral 2905 indicates the image around a line. The image 2905 has not been subjected to a conversion, and the color information is 25%, which is the same as with the image 2902. Reference numeral 2906 indicates the dashed line obtained by converting the line information about the line 2903 by the method of this embodiment. In the dashed line 2906, the stroke repeating unit is 4 px. The color information about the portion of 3 px, which is 75% of 4 px, is 100%. On the other hand, the color information about the remaining portion of 1 px, which is 25% of 4 px, is 0%. In the dashed line 2906, the contrast of the line has the above described maximum value. Accordingly, there will be no change in the image even when the image is subjected to the screen processing at the screen processing unit 2406. That is, line discontinuities that are likely to be formed due to the screen processing can be completely prevented.

FIG. 27 shows the SVG data corresponding to the pre-conversion and post-conversion images shown in FIG. 26. For ease of explanation, positions and sizes are designated in "px" in FIG. 27. Also, color information is designated in "gray". Reference numeral 3001 indicates the pre-conversion data, and reference numeral 3002 indicates the image around the line. In the image 3002, the color information is 25%. Reference numeral 3003 indicates the pre-conversion line in which the color information is 75%. As shown in this example, a graphic defined in a SVG description is drawn over a graphic that was defined earlier.

Reference numeral 3004 indicates the post-conversion data. Reference numeral 3005 indicates the image around the line, and the image 3005 is the same as the image 3002. Reference numerals 3006 and 3007 indicate dashed lines after the conversion. The line 3006 corresponds to the portion in which the color information is 0%, and the dashed line 3007 corresponding to the portion in which the color information is 100% is drawn over the line 3006.

Modifications

In the first through fourth embodiments and the sixth embodiment, the width of a line and the color information about the line are changed. In the fifth, seventh, and eighth embodiments, the stroke information about a line and the color information about the line are changed. Those structures may be combined so that the width of a line, the stroke information about the line, and the color information about the line can be simultaneously changed. For example, the line information correcting unit described in the first embodiment and the line information correcting unit described in the fifth embodiment may be connected in series so that the width of a line, the stroke information about the line, and the color information about the line can be simultaneously changed.

The present disclosure can be realized by providing a system or an apparatus with a storage medium storing the program codes of the software for realizing the functions of the above described embodiments. In such a case, the system of the computer (or a CPU or a MPU) in the apparatus reads and executes the program codes stored in the computer-readable storage medium, to realize the functions of the above described embodiments.

According to the present disclosure, lines included in an image can be appropriately corrected, and a high-quality image can be output.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application Nos. 2013-103323, filed May 15, 2013, and 2014-082023, filed Apr. 11, 2014, which are hereby incorporated by reference herein in their entirety.

What is claimed is:

1. An image processing apparatus comprising:
    an input unit configured to accept input data;
    a detecting unit configured to detect line information from the input data, the line information indicating color information about a line included in the input data, color information about a background of the line, a width of the line; and
    a converting unit configured to convert the line information based on a contrast integrated value and a difference between the color information about the background and the color information about the line, the contrast integrated value being determined by the color information about the background, the color information about the line, and the width of the line,
    wherein the contrast integrated value is calculated based on the product of a difference between the color information about the line and the color information about the background of the line, and the width of the line.

2. The image processing apparatus according to claim 1, wherein the converting unit converts the color information about the line and the width of the line in the line information.

3. The image processing apparatus according to claim 1, wherein
    the line information further contains stroke information about the line, and
    the converting unit converts the stroke information.

4. The image processing apparatus according to claim 1, further comprising:
    a generating unit configured to generate raster data based on the line information converted by the converting unit; and
    a screen processing unit configured to perform screen processing on the raster data.

5. The image processing apparatus according to claim 1, wherein the line information is represented by an R component, a G component and a B component.

6. The image processing apparatus according to claim 5, further comprising a color converting unit configured to convert a combination of values of the R component, the G component and the B component, which represent the line information, into cyan, magenta, yellow and black,
   wherein the converting unit is configured to convert the line information converted by the color converting unit.

7. The image processing apparatus according to claim 1, wherein the color information indicated by the line information indicates density.

8. An image processing apparatus comprising:
   an input unit configured to accept input data;
   a detecting unit configured to detect line information from the input data, the line information indicating color information about a line included in the input data, color information about a background of the line, a width of the line; and
   a converting unit configured to convert the line information based on a contrast integrated value and a difference between the color information about the background and the color information about the line, the contrast integrated value being determined by the color information about the background, the color information about the line, and the width of the line,
   wherein the converting unit converts the line information so as to maximize an absolute value of the difference while the contrast integrated value remains unchanged.

9. A non-transitory computer-readable medium containing a computer software program to be read and executed by a computer,
   the program causing the computer to function as an image processing apparatus comprising:
   an input unit configured to accept input data;
   a detecting unit configured to detect line information from the input data, the line information indicating color information about a line included in the input data, color information about a background of the line, a width of the line; and
   a converting unit configured to convert the line information based on a contrast integrated value and a difference between the color information about the background and the color information about the line, the contrast integrated value being determined by the color information about the background, the color information about the line, and the width of the line,
   wherein the contrast integrated value is calculated based on the product of a difference between the color information about the line and the color information about the background of the line, and the width of the line.

10. An image processing method for an image processing apparatus including an input unit, a detecting unit, and a converting unit, the image processing method comprising:
    accepting input data by the input unit;
    detecting, by the detecting unit, line information from the input data, the line information indicating color information about a line included in the input data, color information about a background of the line, and a width of the line; and
    converting, by the converting unit, the line information based on a contrast integrated value and a difference between the color information about the background and the color information about the line, the contrast integrated value being determined by the color information about the background, the color information about the line, and the width of the line,
    wherein the contrast integrated value is calculated based on the product of a difference between the color information about the line and the color information about the background of the line, and the width of the line.

11. An image processing apparatus comprising:
    an input unit configured to accept input data;
    a detecting unit configured to detect line information from the input data, the line information indicating a parameter indicating density of a line included in the input data, a parameter indicating density of a background of the line, a width of the line; and
    a converting unit configured to convert the line information based on a contrast integrated value and a difference between the parameter indicating density of the background and the parameter indicating density of the line, the contrast integrated value being determined by the parameter indicating density of the background, the parameter indicating density of the line, and the width of the line
    wherein the contrast integrated value is calculated based on the product of a difference between the parameter indicating density of the line and the parameter indicating density of the background of the line, and the width of the line.

12. An image processing method for an image processing apparatus including an input unit, a detecting unit, and a converting unit, the image processing method comprising:
    accepting input data by the input unit;
    detecting, by the detecting unit, line information from the input data, the line information indicating a parameter indicating density of a line included in the input data, a parameter indicating density of a background of the line, a width of the line; and
    converting, by the converting unit, the line information based on a contrast integrated value and a difference between the parameter indicating density of the background and the parameter indicating density of the line, the contrast integrated value being determined by the parameter indicating density of the background, the parameter indicating density of the line, and the width of the line,
    wherein the contrast integrated value is calculated based on the product of a difference between the parameter indicating density of the line and the parameter indicating density of the background of the line, and the width of the line.

13. A non-transitory computer-readable medium containing a computer software program to be read and executed by a computer,
    the program causing the computer to function as an image processing apparatus comprising:
    an input unit configured to accept input data;
    a detecting unit configured to detect line information from the input data, the line information indicating a parameter indicating density of a line included in the input data, a parameter indicating density of a background of the line, a width of the line; and
    a converting unit configured to convert the line information based on a contrast integrated value and a difference between the parameter indicating density of the background and the parameter indicating density of the line, the contrast integrated value being determined by the parameter indicating density of the background, the parameter indicating density of the line, and the width of the line,
    wherein the contrast integrated value is calculated based on the product of a difference between the parameter indicating density of the line and the parameter indicating density of the background of the line, and the width of the line.

* * * * *